United States Patent
Arisawa et al.

[11] Patent Number: 5,989,731
[45] Date of Patent: Nov. 23, 1999

[54] COMPOSITE MATERIAL AND METHOD OF MANUFACTURING THE SAME

[75] Inventors: Yoshifumi Arisawa; Michio Otsuka; Hideki Moriguchi, all of Hyogo, Japan

[73] Assignee: Sumitomo Electric Industries, Ltd., Osaka, Japan

[21] Appl. No.: 08/744,998

[22] Filed: Nov. 7, 1996

[30] Foreign Application Priority Data

| Nov. 7, 1995 | [JP] | Japan | 7-314783 |
| Nov. 7, 1995 | [JP] | Japan | 7-314784 |
| Nov. 7, 1995 | [JP] | Japan | 7-314785 |
| Oct. 1, 1996 | [JP] | Japan | 8-281435 |

[51] Int. Cl.$^6$ ............. B32B 15/04; B22F 3/00; C22C 32/00
[52] U.S. Cl. ............. 428/627; 428/547; 428/551; 428/610; 428/634; 428/668; 419/10; 419/13; 419/14; 419/15; 419/18
[58] Field of Search ............. 428/547, 551, 428/610, 627, 698, 699, 634, 668; 419/10, 13, 14, 15, 18

[56] References Cited

U.S. PATENT DOCUMENTS

| 4,066,451 | 1/1978 | Rudy | 75/240 |
| 4,650,722 | 3/1987 | Brown et al. | 428/614 |
| 4,830,930 | 5/1989 | Taniguchi et al. | 428/547 |
| 4,911,989 | 3/1990 | Minoru et al. | 428/547 |
| 5,279,901 | 1/1994 | Akerman et al. | 428/469 |
| 5,580,666 | 12/1996 | Dubensky et al. | 428/552 |
| 5,623,723 | 4/1997 | Greenfield | 419/6 |

FOREIGN PATENT DOCUMENTS

| 52-50906 | 4/1977 | Japan |
| 53-1609 | 1/1978 | Japan |
| 6-287076 | 10/1994 | Japan |
| 7-3306 | 1/1995 | Japan |

*Primary Examiner*—Paul Thibodeau
*Assistant Examiner*—Holly C. Rickman
*Attorney, Agent, or Firm*—W. F. Fasse; W. G. Fasse

[57] ABSTRACT

In a composite material manufactured by connecting a sintered body to a surface of a metal substrate, the connection strength under a high temperature is increased, stress relaxation in the composite material is attained, and the strength, wear resistance and corrosion resistance are improved. The sintered body has a multilayer structure having layers with different compositions, i.e. compositions that vary or differ in a direction perpendicular to the connection surface, and the volume relation between the respective layers of the sintered body and the substrate is (substrate volume×0.2)≧(sintered body volume/number of layers), while the thickness of each layer is at least 0.2 mm and not more than 5 mm.

30 Claims, 11 Drawing Sheets

COMPOSITE MATERIAL AND METHOD OF MANUFACTURING THE SAME

BACKGROUND OF THE INVENTION

1. Field of the Invention

The present invention relates to a composite material which is prepared by connecting a sintered body of cemented carbide or the like to a surface of a substrate of steel or the like, and a method of manufacturing the same. More particularly, it relates to a composite material which can attain stress relaxation and a method of manufacturing the same.

2. Description of the Background Art

As techniques for connecting materials having remarkably different linear expansion coefficients such as a metal and ceramics with each other, the following methods are known in the art:

(1) Japanese Patent Laying-Open No. 52-50906 (1977)

A shock-resistant cemented carbide member having a large Co content is interposed between a cemented carbide cutting member having a small Co content and a medium carbon steel member for connecting these members, and these three members are heated and pressurized to be integrally connected with each other by diffusion of cobalt.

(2) Japanese Patent Laying-Open No. 53-1609 (1978)

Sintering powder having excellent fusibility with respect to a cemented carbide member and a base material of steel or the like is arranged between these members, and these three members are integrally sintered and connected with each other by energization pressing.

(3) Japanese Patent Laying-Open No. 7-3306 (1995)

A cemented carbide member for connection is interposed between a hard cemented carbide member and a steel member. A binder phase ratio in the cemented carbide member for connection is 10 to 45 wt. % greater than that in the hard cemented carbide member.

(4) Japanese Patent Laying-Open No. 6-287076 (1994)

A gradient functional member having a gradient mixed layer consisting of a metal and ceramics arranged between metal and ceramic members is energized and sintered by a forming outer frame and upper and lower push rods. The mixed layer has an inclined composition, i.e., a concentration gradient (composition change) of the components. The energization is effected along a pressure axis direction, i.e., from the first push rod toward the second push rod through the gradient functional member. In this case, the thickness of the forming outer frame serving as one of energization paths is varied to form a temperature gradient which is responsive to the inclined or gradient composition.

While each of the aforementioned techniques (1) to (3) attains its object, stress in the composite material is easily unbalanced in actual manufacturing, due to the difference between and volume ratios of the materials forming the respective layers. Consequently, the composite material is insufficient in durability or the like.

In the technique (4), on the other hand, it is difficult to obtain a gradient functional member of excellent quality due to influences exerted by the conductivity of the upper and lower push rods, the sectional area of the forming outer frame, clearances between the forming outer frame and the upper and lower push rods and the like. Particularly when the connection area is large, the forming outer frame for energization is so extremely increased in size that high power is required and the cost for the outer frame is increased. Further, the shape of the composite material is disadvantageously restricted by that of the forming outer frame, due to sintering/connection through the forming outer frame.

While a cemented carbide member is connected with a steel member by brazing in general, the following problems are known in relation to this technique:

(1) The connection strength is reduced under a high temperature environment, due to softening of the brazing filler metal.

(2) The steel member cannot be heat treated after brazing, for a reason similar to the above.

(3) The brazing is performed in a separate step, and hence the manufacturing cost is increased.

SUMMARY OF THE INVENTION

An object of the present invention is to improve the strength, wear resistance and corrosion resistance of a composite material which is prepared by connecting a sintered body to a surface of a metal substrate by increasing the connection strength under a high temperature and attaining stress relaxation in the composite material.

Another object of the present invention is to provide a method of manufacturing the aforementioned improved composite material.

The present invention has been proposed as a result of various studies which have been conducted regarding the volume ratio of a substrate and a sintered body, and the thicknesses, materials and porosity values of respective layers in the sintered body of a multilayer structure, in order to solve the aforementioned problems.

The present invention is characterized in that, in a composite material which is prepared by connecting a sintered body to a surface of a metal substrate, the sintered body has a multilayer structure having layers with different compositions, i.e. compositions that vary in a direction extending perpendicularly to the connection surface, the volume relation between the sintered body and the substrate is (substrate volume×0.2)≧(sintered body volume/number of layers), and the thickness of each layer is at least 0.2 mm and not more than 5 mm.

Due to such definition of the volume relation and the thickness of each layer, the performance of the uppermost layer requiring wear resistance and corrosion resistance can be remarkably improved while facilitating stress relaxation in each layer. The stress relaxation effect is reduced if the thickness of each layer is less than 0.2 mm, while compressive stress in the central portion is excessively increased and results in a reduction of strength if the thickness exceeds 5 mm. Stress relaxation is effectively attained when the sintered body has a multilayer structure of at least three layers, in particular.

The sintered body is preferably prepared from at least one material selected from cemented carbide, cermet, ceramics and stellite. In particular, the sintered body preferably has a structure obtained by dispersing and holding hard phase grains in a binder phase metal.

Exemplary binder phase metals are Fe, Co, Ni and Cr.

Exemplary hard phases are hardly fusible metal compounds, i.e., ceramics such as a carbide, an oxide, a boride and a nitride.

Further, the inventive composite material has the following structure(s) independently of or in combination with each other, in addition to the aforementioned restriction of the volume relation and the thickness of each layer:

(1) Among the layers forming the sintered body, the first layer which is in contact with the substrate has the largest binder phase content. The sintering property is improved by increasing the binder phase content in the first layer, which contributes to stress relaxation with respect to the substrate.

(2) In at least one of the layers forming the sintered body, the binder phase content is increased from its central portion toward the outer periphery. This structure also contributes to stress relaxation with respect to the substrate.

(3) Binder phase contents $X_n$ and $X_{n+1}$ in the n-th and n+1-th layers of the sintered body counted from the connection surface are in a relation of $X_n-20 \geq X_{n+1} \geq X_n-5$ in weight ratio. The strength is reduced due to excessive stress between the respective layers if the binder phase content $X_{n+1}$ exceeds $X_n-20$, while the stress relaxation effect is reduced if the binder phase content is smaller than $X_n-5$.

(4)-[1] The binder phase of the sintered body is mainly composed of Fe, Co and Ni, and the first layer which is in contact with the substrate has the highest weight ratio of (Co+Fe)/Ni, which is reduced upward through or among the layers. (4)-[2] The binder phase of the sintered body is mainly composed of Fe, Co and Ni, and the first layer which is in contact with the substrate has the highest weight ratio of Fe/(Co+Ni), which is reduced upward through the layers. In the sintered body of cemented carbide, a portion around the connection interface contributes to only stress relaxation and strength, and hence it is necessary to increase the binder phase content for improving the sintering property. Therefore, improvement of the Co and Fe ratios, particularly the Fe ratio, is effective for improving the sintering property under a low temperature, suppressing deterioration on the substrate side and reducing the cost.

(5) Among the layers forming the sintered body, the first layer which is in contact with the substrate has pores of less than 25 μm in size and a porosity in excess of 0.6 vol. %, while the uppermost layer has a porosity of not more than 0.2 vol. %. In particular, the pores are preferably not more than 10 μm in size. If the upper layer part has large-sized pores and a high porosity, it leads to deterioration of the wear resistance. The aforementioned structure is formed by a gradient temperature field with an increasing sintering temperature upward through the layers, i.e. perpendicularly to the layers. In this case, a liquid phase appearance temperature of the binder phase can be reduced downward through the layers, to shift or differentiate the liquid phase appearance temperatures of the respective layers from each other. Consequently, movement of the binder phase is caused around the interfaces between the respective layers, thereby contributing to a resulting stress relaxation due to continuous composition change.

(6) Assuming that $C_n$ represents a carbon content in an n-th layer of the sintered body counted from the substrate, the factor $Z_n$ expressed as follows is increased downward through the layers:

$$Z_n = (C_n - b_n)/(a_n - b_n)$$

where $a_n$ and $b_n$ represent the lower and upper limits of carbon contents leading to a depositing, i.e. precipitating of free carbon and a η phase in the composition of the n-th layer respectively.

The differences between the factor $Z_n$ in the respective layers cause differences between the liquid phase appearance temperatures for the binder phase, and result in movement of the binder phase between the respective layers in an initial stage of sintering. Thus, the variation of change of hardness in the thickness direction of the sintered body is smoothed by increasing the factor $Z_n$ downward through the layers, thereby implementing a high hardness in the upper layer part.

(7) Deposition of free carbon is observed in the first layer, which is in contact with the substrate, among the layers forming the sintered body.

(8)-[1] Among the layers forming the sintered body, the first layer which is in contact with the substrate has fracture toughness of at least 10 MPa·m$^{1/2}$ and the uppermost layer has hardness of at least 1500/Hv. Due to this restriction, a composite material having both toughness and hardness for relaxing stress with respect to the substrate is obtained. (8)-[2] Further, each layer of the sintered body has compressive residual stress σ in its central portion, in the range of $0.1 \leq \sigma \leq 1.0$ GPa. While alloy strength of each layer is effectively improved when cemented carbide has residual stress of at least 0.1 GPa, compressive stress is excessively increased to readily cause breakage by compression if the residual stress exceeds 1.0 GPa.

(9)-[1] Among the layers forming the sintered body, at least one layer has a region having a different composition, i.e. a composition that varies in a direction parallel to the connection surface. (9)-[2] Among the layers forming the sintered body, at least one layer has a slit. It is possible to relax the stress between the substrate and the sintered body by providing such a region having a different composition varying in the direction parallel to the connection surface, or the slit.

(10) If the sintered body is made of cemented carbide, the grain sizes of WC are reduced from the central portion toward the outer periphery at least in one of the layers forming the sintered body. Stress relaxation can be attained also by this structure.

(11) When the sintered body is made of cemented carbide, the grain sizes of WC which is a hard phase are reduced upward through the layers, while the first layer, which is in contact with the substrate, has a mean grain size of WC of at least 4 μm and the uppermost layer has a mean grain size of WC of not more than 2 μm. Crack propagation resistance is increased to improve strength by increasing the grain sizes of WC in the lower layer, corrosion resistance is improved by reducing the grain sizes of WC in the upper layers, and wear resistance is improved by such an effect that a mean free path of the binder phase can be reduced.

(12) When the hard phase in the first layer which is in contact with the substrate contains B1 crystals of at least one of carbides, nitrides and carbo-nitrides of the metals belonging to the groups 4a, 5a and 6a mainly composed of Ti, any of the following structures is preferable, so that stress between the substrate and the sintered body can be relaxed:

[1] The content of the B1 crystals in the sintered body is reduced upward through the layers.

[2] The contents $Y_n$ and $Y_{n+1}$ of the B1 crystals in the n-th and n+1-th layers from the connection surface are in the relation $Y_n-40 \geq Y_{n+1} \geq Y_n-10$. The strength is reduced if the content $Y_{n+1}$ exceeds $Y_n-40$ since the stress between the respective layers is excessively increased, while the effect of stress relaxation is reduced if the content $Y_{n+1}$ is smaller than $Y_n-10$.

[3] The content of the B1 crystals is increased from the central portion toward the outer periphery at least in one of the layers forming the sintered body.

The composite material according to the present invention is also characterized in that the sintered body, in case of containing WC as a hard phase, has the following structures in relation to the grain sizes, distribution etc. of WC. While the present invention is effective with only the following structures as a matter of course, these structures may be combined with the aforementioned restriction of the volume relation and the thickness of each layer.

(1) The uppermost layer of the sintered body has a mean grain size of WC of at least 4 μm. In an urban developing tool or a mine tool, sediment wear performance and shock resistance are improved by employing coarse WC grains for the uppermost layer of the sintered body, thereby attaining remarkable improvement of the tool life. In such a field, improvement of performance cannot be attained in a tool which is made of WC having small grain sizes since the tool is worn while the WC grains fall out of the tool. Further, extension resistance upon cracking caused by a shock is improved due to the coarse WC grain sizes, whereby shock resistance is also improved.

(2) In the uppermost layer of the sintered body, the WC grain size distribution has two peaks, which are at least 4 μm and not more than 2 μm respectively on coarse and fine grain sides. Due to such employment of WC having two peaks in its grain size distribution, hardness can be improved while maintaining strength in the uppermost layer.

(3) The uppermost layer of the sintered body contains polygonal WC grains, while at least one of the remaining layers contains rounded WC grains. WC is preferably connected with the substrate of steel or the like in the shortest time at the minimum temperature, in order to maintain the multilayer state of the raw material powder and to prevent dissolution of the steel. Therefore, the grains of WC are hardly grown but are rounded while keeping the shapes in mixing and pulverization of the raw material powder. However, polygonal WC grains grown by being dissolved and deposited in the binder phase metal during sintering have by far higher strength. Therefore, sintering is performed in a short time within several minutes by energization pressure sintering. In this case, only a surface side of a raw material member for the sintered body is heated to a high temperature of at least 1500° C., for example, whereby the WC grains can be grown only in the uppermost layer of the sintered body, so as to have polygonal shapes. In order to heat only the surface side of the raw material member, the programming rate (the current value in temperature increase) is increased within ten minutes, or a punch heater which is brought into contact with the surface of the raw material member is made of a high resistance material or brought into a high resistance shape.

The inventive composite material is also characterized in that, in a composite material prepared by connecting a cemented carbide member to a surface of a metal substrate, a first region of 10 to 1000 μm from the surface of the uppermost layer of the WC cemented carbide member has a binder phase content of not more than 5 wt. %, and a second region of within 500 μm from a portion immediately under the first region has a larger binder phase content than the first region, so as to have an extreme or local maximum value of the binder phase content therein. The binder phase contents are preferably reduced upward and increased downward through or among the layers, in order to improve wear resistance. If the binder phase content in the uppermost layer is not more than 5 wt. %, however, strength may be insufficient in this portion. Therefore, it is effective to provide the second region which is enriched in binder phase content immediately under the first region having a small binder phase content. Thus, a crack caused in the surface layer part can be prevented from propagating to the internal direction, whereby strength can be improved.

The inventive composite material is also characterized in that a sintered body is sintered and connected to at least one of outer and inner peripheral surfaces of a cylindrical substrate. As described later, heating and pressurizing means is relatively moved with respect to a raw material member for the sintered body, so that the sintered body can be sintered and connected to the substrate of a three-dimensional shape having cylindrical outer and inner peripheries.

In a method according to the present invention which is suitable for manufacturing the aforementioned composite material, a raw material member for a sintered body having a linear expansion coefficient which is different from that of a metal substrate is arranged on a rear surface of the substrate and this raw material member is heated by heating means from its surface side and pressurized by pressurizing means, so that the raw material powder or other form of member is sintered and connected to the substrate. The raw material member is heated from its surface side, whereby a temperature gradient can be so formed that the surface side is at a high temperature and a connection surface side is at a low temperature. The heating and pressurizing means can be any means that can attain a temperature and pressure capable of sintering the raw material. Any heating means such as energization, a high frequency or a microwave, for example, can be applied as the heating means.

The sintered body is preferably prepared from at least one material selected from cemented carbide, cermet, ceramics and stellite.

The raw material member is prepared from any of powder, a previously pressed embossed body, a presintered body, and a laminate thereof.

The present invention is also characterized in that heating and pressurizing means are relatively moved with respect to the raw material member for a sintered body, so that the sintered body having an area which is larger than a working area of the heating and pressurizing means for the raw material member is connected to the substrate. Thus, a composite material having a sintered body of an area larger than the working area of the heating and pressurizing means for the raw material member, particularly a three-dimensional shape such as a cylindrical form, can be obtained.

Exemplary heating means include a heater which is placed on the surface of the raw material member for the sintered body. Sintering can be performed by energizing this heater. The pressurizing means may press the heater against the raw material member.

When the heating means is a heater, this heater preferably has a function of a forming die. In other words, the heater has the shape of a forming die. Thus, the sintered body can be sintered and connected to the substrate without separately employing a forming die.

The heating means preferably includes an outer heater for heating a portion of the raw material member around its outer peripheral portion. For example, a frame-type or annular outer heater enclosing the outer periphery of the raw material member may be employed. Thus, temperature reduction can be suppressed in the outer peripheral portion of the raw material member. When the pressurizing means is so structured as to also pressurize the side surface of the outer peripheral portion of the raw material member, further, the side surface of the outer periphery of the raw material member can be heated and pressurized.

According to the inventive composite material, as hereinabove described, it is possible to improve surface hardness of the sintered body, eliminate internal cracking or clearance, and sufficiently densify the sintered body by defining the volume relation between the sintered body of the multilayer structure and the substrate, and the thickness of each layer.

Further, it is possible to reduce the stress difference (difference resulting from compression and tension caused in central and end portions of the sintered body respectively regardless of the distance from the connection surface) caused by the positions of the substrate and the sintered body, by restricting the binder phase distribution and the sizes of the hard phase grains in the sintered body and forming the composition distribution of the sintered body in parallel with the connection surface. Thus, it is possible to improve the balance between the sintered body strength around the connection surface and wear resistance in the upper layer part. In particular, this effect is further improved by providing a discontinuous region or a slit.

According to the inventive manufacturing method, in addition, a temperature gradient can be readily formed by heating the raw material member on the substrate from its surface side. Thus, the method is optimum for connecting a sintered body having different compositions in the thickness direction onto the substrate. In particular, the obtained composite material has high connection strength under a high temperature, and completely eliminates disadvantages of the composite material that ordinarily result from brazing. Further, it is possible to obtain a composite material of a long life having strength, wear resistance and corrosion resistance in better balance than a composite material manufactured by the conventional sintering and connection method.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention are now described.

Structure of Composite Material

Figure 1:
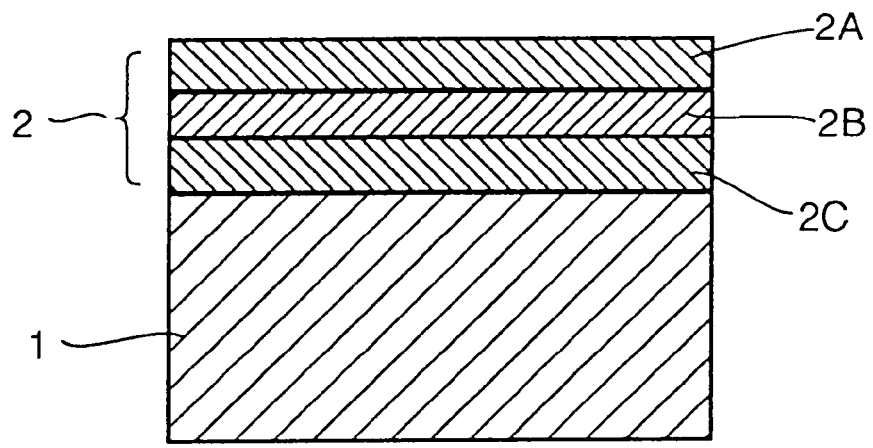
FIG. 1 is a longitudinal sectional view showing an exemplary composite material according to the present invention.

FIG. 1 is a longitudinal sectional view showing an exemplary composite material according to the present invention. Referring to FIG. 1, a sintered/connected sintered body 2 having a multilayer structure is positioned on a substrate 1 of steel or the like. Assuming that "$\alpha_A$, $\alpha_B$" and "$\alpha_C$, $T_{SA}$, $T_{SB}$ and $T_{SC}$, and $T_{MA}$, $T_{MB}$ and $T_{MC}$ represent the linear expansion coefficients, the sintering temperatures and the melting points of respective layers 2A, 2B and 2C of the sintered body 2 respectively and "$\alpha_M$, $T_{SM}$ and $T_{MM}$ represent the linear expansion coefficient, the sintering temperature and the melting point of the substrate 1 respectively, these values are in the following relations:

$$\alpha_M - \alpha_A > \alpha_M - \alpha_B > \alpha_M - \alpha_C$$

$$T_{SM} - T_{SA} > T_{SM} - T_{SB} > T_{SM} - T_{SC}$$

$$T_{MM} - T_{MA} > T_{MM} - T_{MB} > T_{MM} - T_{MC}$$

Figure 2:
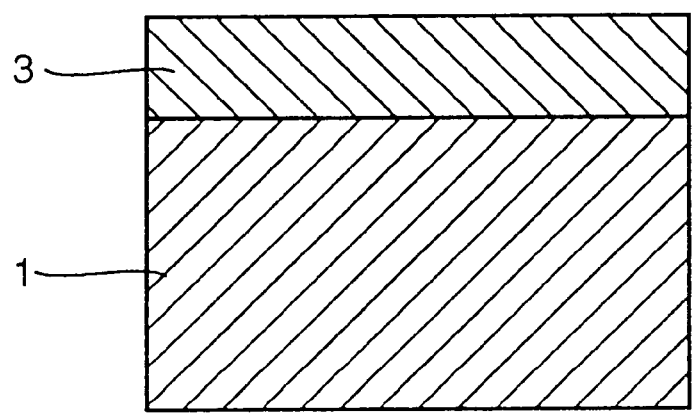
FIG. 2 is a longitudinal sectional view showing another exemplary composite material according to the present invention.
Figure 3:
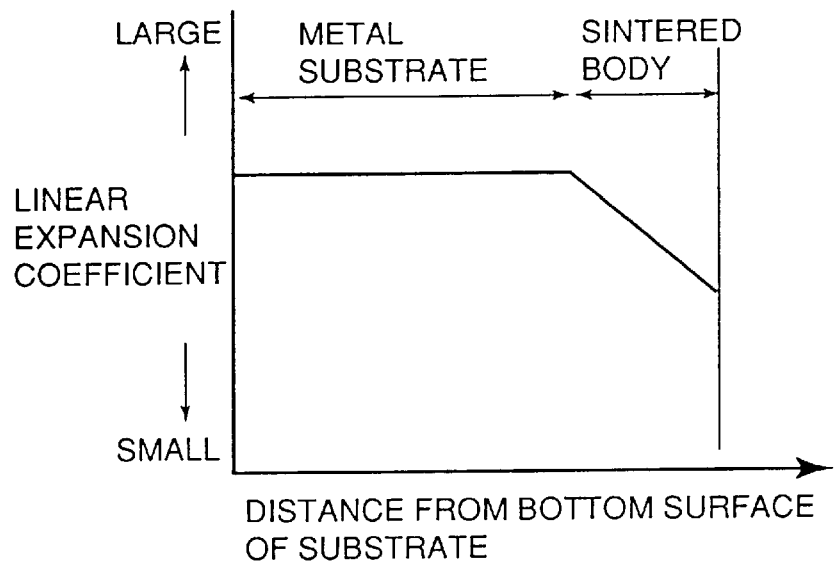
FIG. 3 is a graph showing the relation between linear expansion coefficients of a substrate and a sintered body in the composite material shown in FIG. 2.
Figure 4:
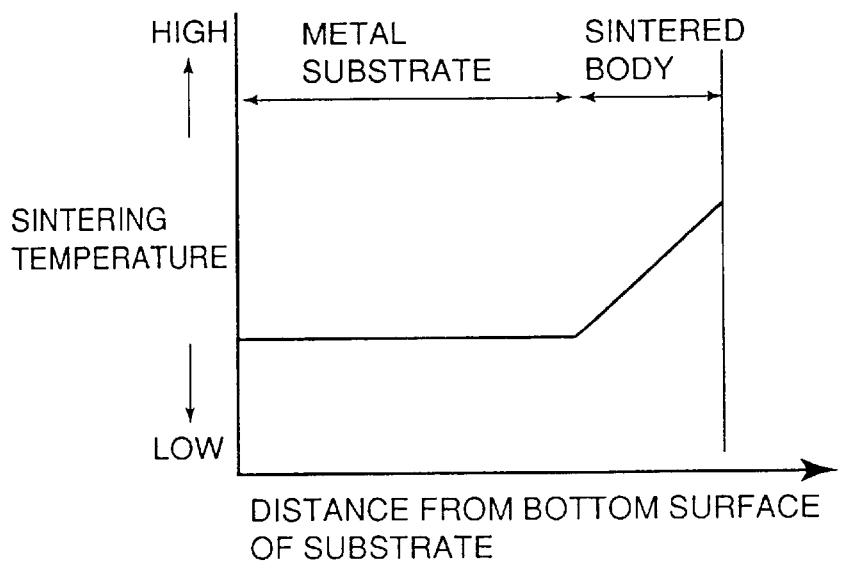
FIG. 4 is a graph showing the relation between sintering temperatures for the substrate and the sintered body in the composite material shown in FIG. 2.

FIG. 2 is a longitudinal sectional view of another exemplary composite material according to the present invention. In this composite material, a sintered body 3 having an inclined or gradient composition (composition varies in a direction perpendicular to a connection surface) is connected onto a substrate 1. In other words, the linear expansion coefficients of the substrate 1 and the sintered body 3 are reduced from the connection surface toward the surface of the sintered body 2 (see FIG. 3), while the sintering temperatures are increased (see FIG. 4).

Apparatus for Manufacturing Composite Material

Figure 5A:
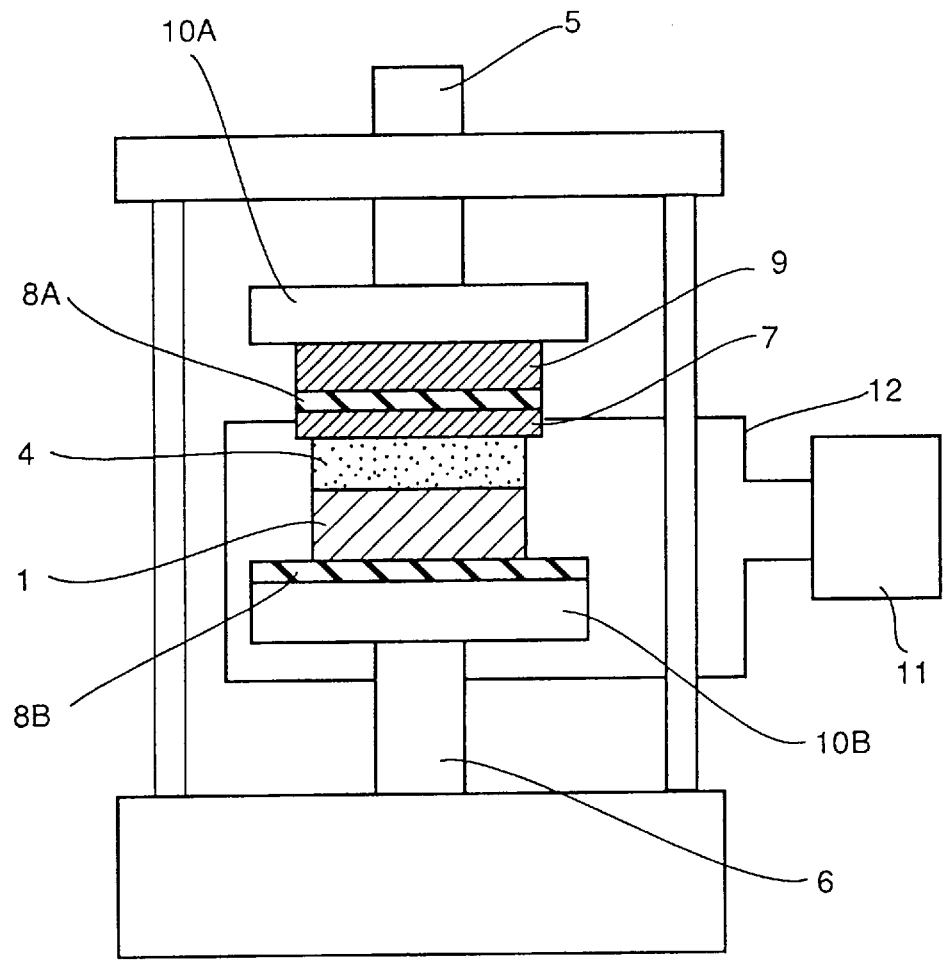
FIG. 5A schematically illustrates an apparatus for manufacturing the inventive composite material, and FIG. 5B schematically illustrates a manufacturing apparatus provided with a heating mechanism also on its side surface.

FIG. 5A is a longitudinal sectional view showing an apparatus for manufacturing the inventive composite material. A raw material member 4 for a sintered body is arranged on a surface of a substrate 1, and these samples are arranged between upper and lower pressure rams 5 and 6. A heater 7 of high-strength graphite, an insulating plate 8A of high-strength $Si_3N_4$, a heat insulating plate 9 of SUS304 and a cooling ram 10A are interposed between an upper surface of the raw material member 4 and the upper pressure ram 5 successively from below. On the other hand, an insulating plate 8B and a cooling ram 10B are interposed between a lower surface of the substrate 1 and the lower pressure ram 6 successively from above. Cooling water flows to the cooling rams 10A and 10B. A heating power source 11 energizes the heater 7 through a lead wire 12 for heating the raw material member 4 to a high temperature, while a pressure is applied by and between the upper and lower pressure rams 5 and 6 to press the heater 7 against the raw material member 4 for sintering/connecting the raw material member 4 to the substrate 1. At the time of sintering, it is preferable to apply a BN (boron nitride) spray to or insert a carbon sheet in a surface of the raw material 4 which is in contact with the heater 7, in order to prevent the heater 7 from damage caused by reaction with the raw material member 4 and to facilitate separation of the samples from the heater 7. The BN spray or the carbon sheet may be properly employed in response to the shapes of the samples. At least the samples (the substrate 1 and the raw material member 4) are stored or received in a vacuum vessel (not shown).

While energization heating is employed for the heater 7 in the above example, the heating method is not restricted to the energization heating but another means such as induction heating or microwave heating may alternatively be employed.

Figure 5B:
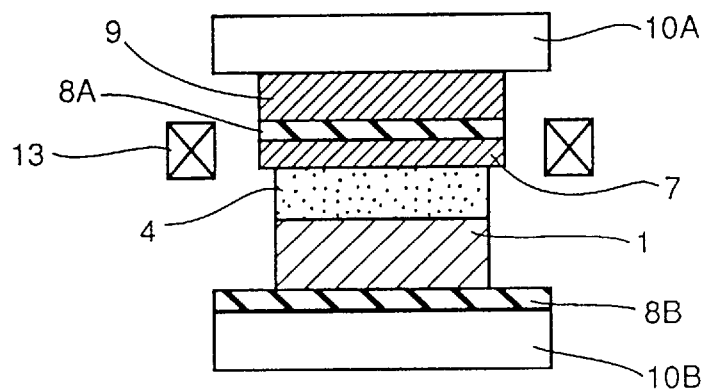

As shown in FIG. 5B, a frame-type outer heater 13 may be set around the outer peripheral portion of the raw material member 4, in order to prevent temperature reduction around the peripheral portion of the heater 7 thereby improving heating efficiency.

Figure 6A:
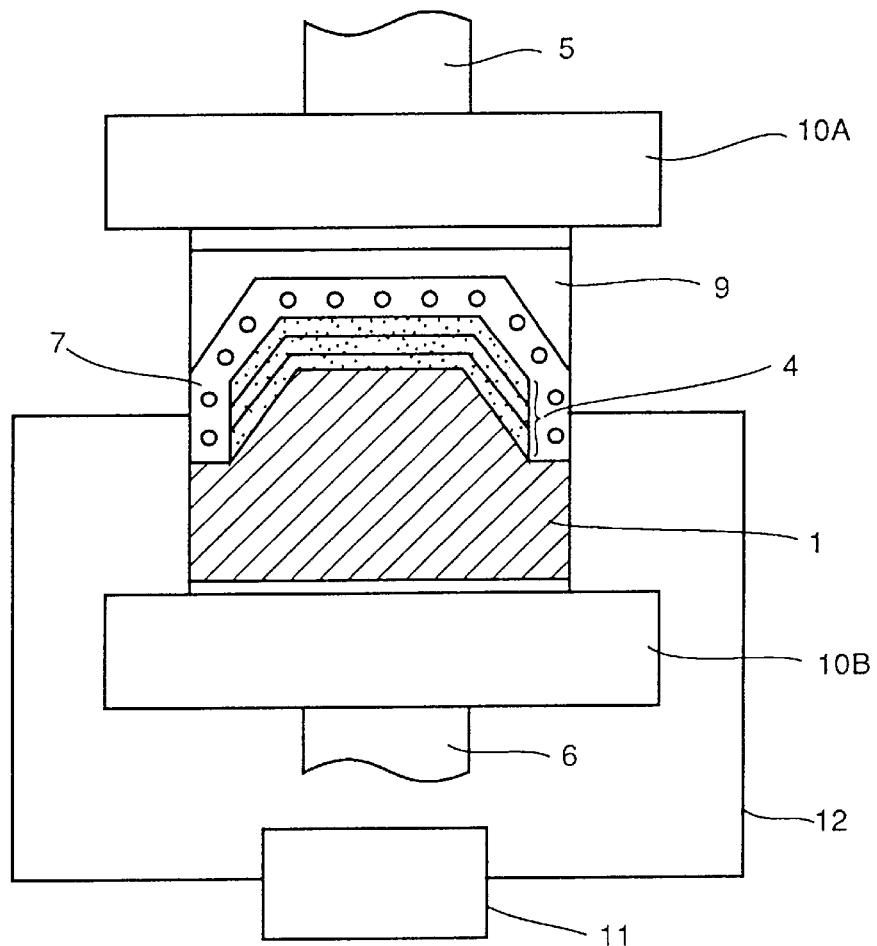
FIG. 6A schematically illustrates an apparatus for manufacturing a composite material provided with a heater having a forming die function, and FIG. 6B schematically illustrates an apparatus provided with a heating and pressurizing mechanism also on its side surface.
Figure 6B:
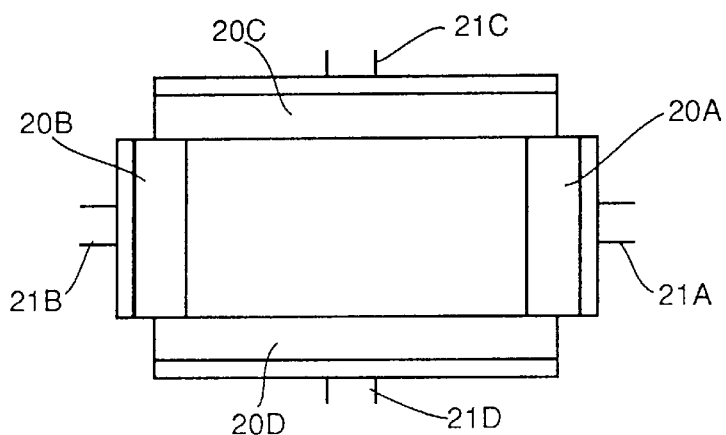

FIG. 6A is a longitudinal sectional view showing another exemplary apparatus for manufacturing the inventive composite material. In this example, a heater 7 has a function of a forming die. In other words, the heater 7 itself has the shape of a forming die. Referring to FIG. 6A, the heater 7 has a shape corresponding to a cylindrical sintered body having a chamfered peripheral edge portion on its upper surface. A raw material member 4 is sintered by energization heating with the heater 7 and pressurization with upper and lower pressure rams 5 and 6, to be connected to a surface of a substrate 1. Referring to FIGS. 6A and 6B, numerals identical to those in FIGS. 5A and 5B denote the same components.

As shown in FIG. 6B, the forming die function of the heater 7 may alternatively be separated into pressurizing functions from an upper portion and side surfaces, so that heating functions from the side surfaces are further added. In other words, side heaters 20A, 20B, 20C and 20D and side pressure rams 21A, 21B, 21C and 21D are provided around connected portions between a substrate and a raw material member.

Figure 7:
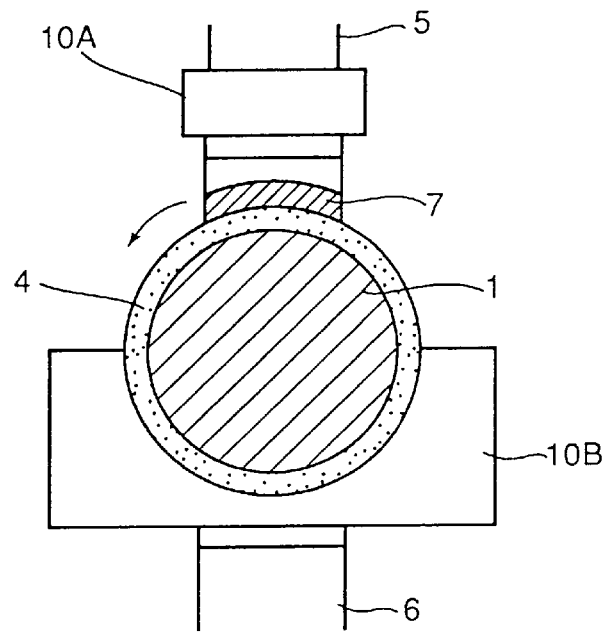
FIG. 7 schematically illustrates an apparatus for sintering and connecting a sintered body to an outer peripheral surface of a cylindrical substrate.
Figure 8:
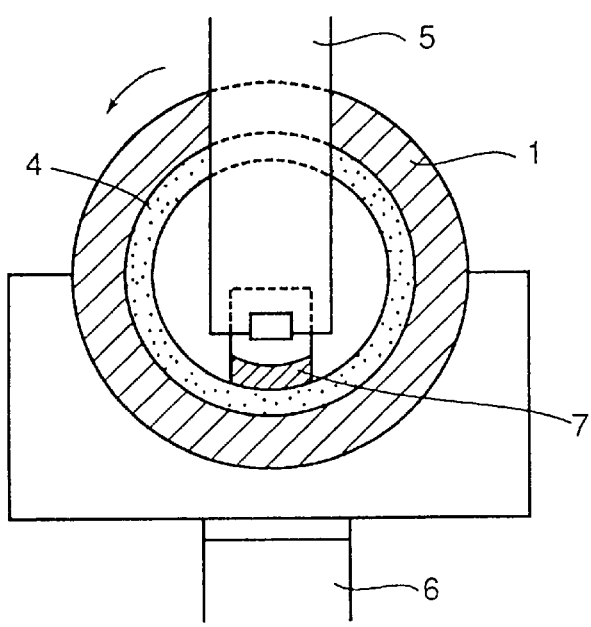
FIG. 8 schematically illustrates an apparatus for sintering and connecting a sintered body to an inner peripheral surface of a cylindrical substrate.

FIGS. 7 and 8 show apparatuses which are different in structure from those shown in FIGS. 5A, 5B, 6A and 6B. In each of these apparatuses, heating/pressurizing means relatively move with respect to samples. Due to this structure, it is possible to manufacture a composite material having an area which is larger than the respective working area of the heating/pressurizing means. This structure is particularly preferable for connecting a sintered body to a substrate having a three-dimensional shape such as a cylindrical (columnar) shape. The shape of the heater is rendered to correspond to that of the sintered body, as a matter of course. Referring to FIGS. 7 and 8, numerals identical to those in FIGS. 5A and 5B denote the same components.

FIG. 7 shows an apparatus for sintering and connecting a raw material member 4 to an outer peripheral surface of a cylindrical (columnar) substrate 1. A heater 7 is set on the outer periphery of the cylindrical substrate 1. The raw material member 4 having an inclined or gradient composition is arranged on the outer peripheral surface of the substrate 1, which in turn is rotated and heated/pressurized by the heater 7, so that a sintered body can be sintered/connected to the overall outer periphery of the substrate 1.

FIG. 8 shows an apparatus for sintering and connecting a raw material member 4 to an inner peripheral surface of a cylindrical substrate 1. A heater 7 is arranged on the inner periphery of the cylindrical substrate 1, and an upper pressure ram 5 is coupled to both end portions of the heater 7 projecting from both end openings of the substrate 1. The raw material member 4 is arranged on the inner peripheral surface of the substrate 1, which in turn is rotated and heated/pressurized by the heater 7, whereby a sintered body can be connected to the inner peripheral surface of the cylindrical substrate 1.

Test Example 1

$Al_2O_3$ powder of 0.5 μm in mean grain size, $ZrO_2$ powder of 0.5 μm in mean grain size, TiC powder of 1 μm in mean grain size, TiN powder of 1 μm in mean grain size, $Cr_3C_2$ powder of 1 μm in mean grain size, $Mo_2C$ powder of 1 μm in mean grain size, WC powder of 2 μm in mean grain size, Co powder of 4 μm in mean grain size, Ni powder of 1 μm in mean grain size, and stainless steel powder (SUS304) of 10 μm in mean grain size were weighed in compositions shown in samples Nos. 1 to 3 in Table 1, then wet-blended in a rotary ball mill for 15 hours, and thereafter dried.

TABLE 1

| No. | Multilayer Structure | $Al_2O_3$ | Tic | TiN | $Cr_3C_2$ | $Mo_2C$ | WC | Co | Ni | Stainless Steel | $ZrO_2$ |
|---|---|---|---|---|---|---|---|---|---|---|---|
| 1 | Third Layer | 90 | 10 | | | | | | | | |
|   | Second Layer |    | 70 | | | | | | 30 | | |
|   | First Layer |    | 30 | | | 10 | | | 60 | | |
| 2 | Third Layer |    | 45 | 15 | 20 | | | 10 | 10 | | |
|   | Second Layer |    | 35 | 10 | 15 | | | 20 | 20 | | |
|   | First Layer |    | 25 | 5 | 10 | | | 30 | 30 | | |
| 3 | Third Layer | | | | | | 93 | 7 | | | |
|   | Second Layer | | | | | | 85 | 15 | | | |
|   | First layer | | | | | | 70 | 30 | | | |

TABLE 1-continued

| No. | Multilayer Structure | Al$_2$O$_3$ | TiC | TiN | Cr$_3$C$_2$ | Mo$_2$C | WC | Co | Ni | Stainless Steel | ZrO$_2$ |
|---|---|---|---|---|---|---|---|---|---|---|---|
| 4 | Continuously graded Structure | | | | | | | | | (Surface Side) 0 ↓ 100 (Connection outer Surface Side) | (Surface Side) 100 ↓ 0 (Connection outer Surface Side) (Wt %) |

The mixed powder materials of the samples Nos. 1 and 2 were employed to prepare pressed laminates as follows:

The powder of each composition was arranged on a surface of a substrate of steel (SS41) of 50 mm$^2$ area by 30 mm thickness, for forming a preformed body of a three-layer structure using a forming die. The first layer, which was connected with the substrate, was pressure-formed into a thickness of 2 mm under pressure of 10 kg/cm$^2$, and then the second and third layers were successively stacked thereon in a similar procedure to the above in thicknesses of 2 mm respectively.

A laminate of a sample No. 4 was prepared as follows: First, slurries were prepared from ZrO$_2$ powder and stainless steel powder with solvents of ethyl alcohol respectively. These slurries were sprayed while slightly changing the mixing ratio of the powder materials, for forming a laminate of 50 layers on a surface of a substrate of stainless steel (SUS304) of 50 mm$^2$ area by 30 mm thickness. Thus, it was possible to obtain a laminate having a composition that changed or varied substantially continuously in the thickness direction from 100% stainless steel to 100% ZrO$_2$. A layer of 100% ZrO$_2$ was stacked on the uppermost layer in a thickness of 1 mm, to obtain a laminate of 6 mm in total thickness. In formation of this laminate, drying of the slurries was immediately ended after the same were sprayed onto the heated stainless steel substrate.

Then, the laminates prepared from the samples Nos. 1, 2 and 4 were set in the apparatus shown in FIG. 5A, which in turn was evacuated to not more than 10$^{-3}$ Torr, and thereafter the samples were pressurized from above and below under a pressure of 400 kg/cm$^2$. The heater was rapidly heated to 1350° C. while maintaining the pressure, and held for 1 minute after stoppage of contraction of the sintered bodies. Thereafter N$_2$ gas was supplied to cool the heater to 400° C. in 3 minutes while maintaining the pressure, and thereafter the apparatus was unloaded for taking out the samples. When the heater was cooled, the flow rate of the cooling water for the lower cooling ram was increased for improving the cooling power.

The obtained composite materials of the samples Nos. 1, 2 and 4 had no defects in appearance such as warpage or cracking. When cutting surfaces were ground and observed, the interiors were sufficiently densified with neither cracks nor clearances or voids.

The samples Nos. 1 and 2 maintained the initial structures of the three layers, while the sample No. 1 having a ceramics surface exhibited a surface hardness H$_V$ of 2500, which was higher by about 300 as compared with that attained by sintering and forming according to the prior art. On the other hand, the sample No. 2 having a cermet surface exhibited a surface hardness H$_V$ of 1750, which was higher by about 200 as compared with that obtained by sintering only the third layer by a general method.

In the sample No. 4 which was prepared by stacking 50 layers having different compositions, the composition of the composite material was not changed or varied in a stepwise manner, dissimilarly to the samples Nos. 1 and 2, but it was possible to implement a substantially continuously graded structure in which the composition was continuously changed. The surface of 100% ZrO$_2$ exhibited a hardness H$_V$ of 1400, which was improved by about 10% as compared with the case of general sintering.

Test Example 2

The apparatus shown in FIG. 6A was employed for preparing a composite material from the sample No. 3 shown in Table 1. The employed substrate was made of steel and had a thickness of 50 mm, a bottom surface diameter of 50 mm and an upper surface diameter of 35 mm, with an upper surface peripheral edge portion chamfered by 7.5 mm. The powder of the sample No. 3 shown in Table 1 was set on the upper surface of this substrate, to prepare a laminate by dust or powder forming with a forming die under a pressure of 20 kg/cm$^2$, so that the third, second and first layers were 1.5 mm, 3.5 mm and 1 mm in thickness respectively. At this time, a BN spray was applied to the surface of the sample which was in contact with a heater.

The aforementioned laminate was set in the apparatus shown in FIG. 6A, and pressurized from above and below with a pressure of 500 kg/cm$^2$. The heater was rapidly heated to 1380° C. in 1 minute in the atmosphere while maintaining the pressure, and held for 30 seconds after stoppage of contraction of the sintered portion. The holding time at 1380° C. was 1.5 minutes. Thereafter the heater was cooled to 500° C. in 2 minutes while maintaining the pressure, and thereafter the apparatus was unloaded for taking out the sample.

The obtained composite material exhibited no defects in appearance such as warpage or cracking in the connected or chamfered portion. When its cutting surface was ground and observed, the interior was sufficiently densified and completely sintered/connected with neither cracks nor clearances or voids. Further, it was confirmed that the initial composition was maintained with no movement of a Co binder phase of cemented carbide.

Test Example 3

Figure 9:
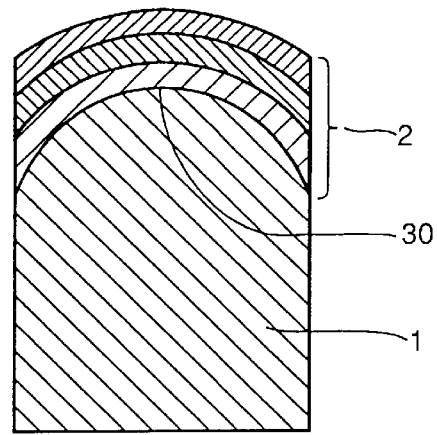
FIG. 9 is a longitudinal sectional view showing a composite material according to the present invention.

Then, samples of a drill bit were prepared and subjected to an excavation test. As shown in FIG. 9, this drill bit is prepared by connecting a sintered body 2 having a multilayer structure to a surface of a substrate 1 of steel (S45C). The overall shape of the drill bit is substantially cylindrical, and a connection surface 30 and a surface of the sintered body 2 have spherical surface shapes. Table 2 shows blending ratios of raw powder materials for the sintered bodies, and Table 3 shows the order of stacked layers forming the sintered bodies, the thicknesses of the respective layers and volume ratios with respect to the steel substrates. The raw material blending ratios substantially define the compositions of the respective layers of the sintered bodies. These powder materials were about 3 μm in mean grain size.

TABLE 2

| Composition No. | Composition |
|---|---|
| A | WC—5% Co |
| B | WC—10% Co |
| C | WC—20% Co |
| D | WC—40% Co |
| E | WC—7% Co |
| F | 60% Bt—40% Co |
| G | WC—20% Bt—40% Co |
| H | WC—15% Bt—40% Co |
| I | WC—10% Bt—40% Co |
| J | WC—30% Bt—20% Co |
| K | 60% Bt—20% Co—10% Fe—10% Ni |
| L | WC—20% Bt—10% Co—5% Fe—25% Ni |
| M | WC—40% Ni |
| N | WC—20% Bt—10% Co—5% Fe—5% Ni |
| O | WC—20% Bt—5% Ni |
| P | WC—20% Bt—1% Co—14% Fe—25% Ni |

Bt =(Ti,Ta,Nb)C, Ti is main metal element in (Ti, Ta, Nb)
(Wt %)

of a pressure of 300 kg/cm$^2$, a current of 2000 A, a temperature of 1380° C. and a holding time of 2 minutes. This heating/pressurizing apparatus is substantially similar in structure to the apparatus shown in FIG. 6A, and comprises a heater 7 of graphite corresponding to the shape of a raw material member 4 on a substrate 1, and the heater 7 is pressed toward the substrate 1 with an upper pressure ram 5 for heating a pressed laminate. Sintering is performed by energizing the heater 7 with a heating power source (DC) 11. The temperature of the heater 7 is controlled by a thermocouple 25. The bottom surface of the substrate 1 is air-cooled.

Table 3 also shows results of the excavation test made on inventive samples Nos. 5 to 12 and comparative samples a to e under the same conditions. In each inventive sample having a sintered body and a steel substrate in a volume relation of (steel volume)×0.2≧sintered body (cemented carbide) volume/(layer number) and each layer of at least 0.2 mm and not more than 5 mm in thickness, the life was remarkably improved as compared with the comparative samples.

TABLE 3

| Sample No. | | Order of Stacked layers First Layer-Second Layer-Third Layer (Thickness:mm) | Steel Volume × 0.2 Sintered Body Volume/Layer Number | Life (H) | Cause for End of Life |
|---|---|---|---|---|---|
| Example | 5 | D(5)-A(0.2) | 1.0 | 200 | Normal Wear |
| | 6 | D(2)-B(2)-A(2) | 1.0 | 250 | Cracking of Sintered Body |
| | 7 | D(2)-C(2)-A(2) | 1.2 | 350 | Normal Wear |
| | 8 | D(2)-E(1)-A(2) | 1.5 | 240 | Cracking of Sintered Body |
| | 9 | F(1)-G(1) | 2.0 | 280 | Wear of Sintered Body |
| | 10 | F(1)-H(1) | 2.0 | 200 | Wear and Cracking of Sintered Body |
| | 11 | F(1)-G(1)-H(1) | 2.0 | 200 | Wear and Cracking of Sintered Body |
| | 12 | F(1)-J(1)-A(1) | 2.0 | 400 | Normal Wear |
| Comparative Example | a | D(5)-A(0.1) | 1.0 | 90 | Wear |
| | b | D(6)-A(0.2) | 1.1 | 20 | Cracking of Sintered Body |
| | c | D(2)-A(2) | 0.95 | 40 | Cracking of Sintered Body |
| | d | C(3) | 1.1 | 5 | Cracking of Sintered Body |
| | e | F(1)-G(0.3) | 0.9 | 10 | Wear and Cracking of Sintered Body |

Each sample of the drill bit was prepared as follows: First, the substrate was introduced into a carbon forming die (not shown), and the powder of the first layer (see Table 3) was charged on the spherical end surface of the substrate and preliminarily pressed. Then, the powder of the second layer was charged and preliminarily pressed again. This operation was repeated again in each sample having the third layer. Alternatively, it is possible to previously stack/charge the respective powder materials for simultaneously preliminarily pressing the same.

Figure 10:
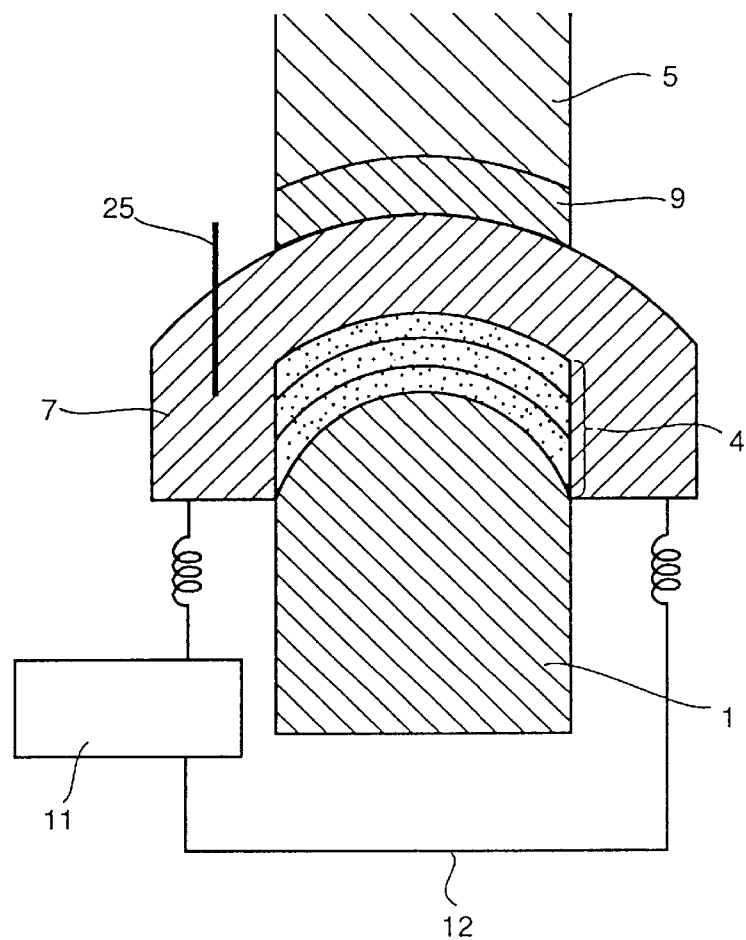
FIG. 10 schematically illustrates an apparatus for manufacturing the composite material shown in FIG. 9.

Each pressed laminate was set in a heating/pressurizing apparatus shown in FIG. 10, and sintered under conditions Test Example 4

Substrates of steel (S53C) were employed for preparing corrosion-resistant valves by connecting sintered bodies thereto, and corrosion depths were observed and evaluated after employment in seawater for 500 hours. Table 4 shows the stacking order of the layers forming the sintered bodies, the thicknesses of the respective layers, volume ratios of the sintered bodies relative to the steel substrates and the results of the test. The corrosion-resistant valves were prepared under the same conditions as Test Example 3.

TABLE 4

| Sample No. | | Order of Stacked layers First Layer-Second Layer-Third Layer (Thickness:mm) | Steel Volume × 0.2 Sintered Body Volume/Layer Number | Corrosioin Depth | Damage | Evaluation |
|---|---|---|---|---|---|---|
| Example | 13 | K(1.0)-L(1.0)-M(3.0) | 1.2 | 1.5 | Sintered Body Worn | ○ |
|  | 14 | K(1.5)-N(1.5)-O(2.0) | 1.2 | 0.5 | Sintered Body: Slightly Worn | ⊙ |
|  | 15 | P(1.5)-N(1.0)-O(2.0) | 1.5 | 0.5 | Sintered Body: Slightly Worn | ⊙ |
| Comparative Example | f | K(1.0)-L(0.5)-M(0.1) | 4.0 | >>1.6 (Steel Corrosion) | Cemented Carbide Dropped | XX |
|  | g | K(1.0)-N(3)-O(6) | 0.8 | 0.5 | Sintered Body Remarkably Chipped | XX |
|  | h | P(1.5)-N(3)-O(5.5) | 0.8 | 0.5 | Sintered Body Slightly Cracked | X |

The inventive samples Nos. 13 to 15 exhibited superior corrosion resistance relative to comparative samples f to h.

Test Example 5

Sintered bodies having the same compositions and multilayer structures as the samples Nos. 6, 11 and 14 in Test Examples 3 and 4 were connected to substrates, for preparing drill bits of samples Nos. 6', 11' and 14' under conditions different from those in Test Examples 3 and 4. Table 5 shows the details of these samples.

In each sample having a greater number of pores in the vicinity of the connection surface of the sintered body and a small number of pores in the upper layer part, strength was improved by a stress relaxation effect and an effect of bottlenecking any cracks to attain a long life, while the comparative sample exhibited no improvement. However, a large content of pores in the upper layer leads to deterioration of wear resistance, and hence the porosity must be not more than 0.2 vol. % in the outermost layer.

TABLE 5

| Sample No. | | Order of Stacked layers First Layer-Second Layer-Third Layer (Thickness:mm) | Steel Volume × 0.2 Sintered Body Volume/Layer Number | Life (H) | Cause for End of Life |
|---|---|---|---|---|---|
| Example | 6' | D(2)-B(2)-A(2) | 1.0 | 350 | Normal Wear |
|  | 1' | F(1)-G(1)-H(1) | 2.0 | 400 | Normal Wear |
|  | 14' | K(1.5)-N(1.5)-O(2.0) | 1.2 | 400 | Normal Wear |
| Comparative Example | i | F(1)-G(1)-H(1) | 2.0 | 80 | Remarkable Wear and Dropping of Sintered Body |

In relation to these samples, the substrates were not air-cooled but water-cooled during in pressurization/sintering. Namely, the bottom portion of the substrate was enclosed with a water cooling jacket in each sample, for increasing the cooling efficiency. The employed cooling water was at a temperature of 30° C., whereby the temperature of the substrate side was reduced by about 30° C. in the sintered body, and it was possible to form a first layer having a porosity exceeding 0.6 vol. %. At this time, the second and third layers were substantially completely sintered, with a porosity of not more than 0.2 vol. %.

The temperature of the cooling water was further reduced to 10° C., for preparing a sample i in a similar manner to the above. The porosity of the first layer of this sample i was in excess of 0.6 vol. %, and that in the uppermost layer was 0.4 vol. %. Table 5 also shows results of an excavation test made on these samples similarly to Test Example 3.

Test Example 6

Substrates of SKD11 were employed for preparing forging punches of samples Nos. 17 to 23 by connecting sintered bodies having multilayer structures thereto under the following conditions. A comparative sample j was prepared by silver-brazing a sintered body to a substrate. Table 6 shows the order of stacked layers forming the sintered bodies and Zn ($Z_1$, $Z_2$, . . . successively from the first layer) of the respective layers.

Structure: (steel volume×0.2)/(sintered body volume/layer number)=1.0

The thickness of each layer was 1 mm.

Manufacturing method: Preliminary pressing was similar to that in Test Example 3.

The sintering conditions were similar to those in Test Example 3, except that the sintering temperature was 1400° C., the holding time was 1 minute, the current was 3000 A and the pressure was 500 kg/cm².

TABLE 6

| Sample No. | | Order of Stacked layers First Layer-Second Layer-Third Layer | Zn $Z_1/Z_2/\ldots$ | Life (numbers) | Cause for End of Life |
|---|---|---|---|---|---|
| Example | 17 | C-B-A | 0.8/0.8/0.8 | 20,000 | Wear and Partial Cracking of Sintered Body |
| | 18 | C-B-A | 0.8/0.6/0.4 | 28,000 | Wear and Partial Cracking of Sintered Body |
| | 19 | F-G-I | 0.75/0.5/0.3 | 19,000 | Wear and Partial Cracking of Sintered Body |
| | 20 | F-J-A | 0.9/0.7/0.5 | 30,000 | Wear and Partial Cracking of Sintered Body |
| | 21 | K-L-M | 0.75/0.5/0.3 | 20,000 | Wear and Partial Cracking of Sintered Body |
| | 22 | K-N-O | 0.8/0.6/0.4 | 33,000 | Wear and Partial Cracking of Sintered Body |
| | 23 | P-N-O | 0.8/0.6/0.4 | 34,000 | Wear and Partial Cracking of Sintered Body |
| Comparative Example | j | C-B-A | 0.8/0.8/0.8 | 300 | Separation on Connection Surface between Sintered Body and Steel Substrate |

The punches of the respective samples were employed for hot-forging steel products of S45C at a material temperature of 800° C. under 400 tons. Table 6 also shows the numbers of products forged before ends of the tool lives. It is understood that the lives of the inventive samples were remarkably increased as compared with the comparative sample.

Figure 11:
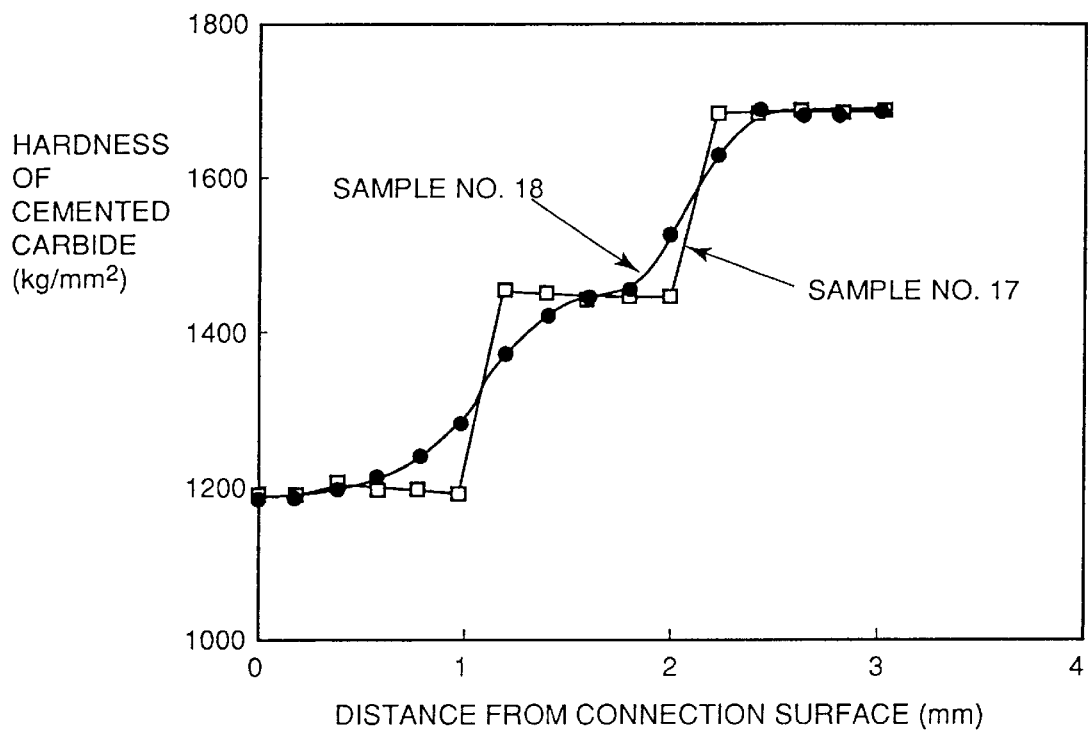
FIG. 11 is a graph showing the relations between the distances from connection surfaces of composite materials according to the present invention and hardness values of sintered bodies.

FIG. 11 illustrates hardness values of the sintered bodies in the composite materials of the samples Nos. 17 and 18.

In the sample No. 18, differences were caused between liquid phase appearance temperatures of binder phases in the respective layers due to the differences between the factor Zn, to result in movement of the binder phases between the respective layers in an initial stage of sintering. Consequently, the hardness values were smoothly changed between the respective layers as compared with the sample No. 17 which had no such difference in Zn.

Test Example 7

In the samples Nos. 17 to 23 of Test Example 6, the sintered bodies were partially cracked due to forging. In relation to this, substitutional samples having generally the same structures were prepared by changing only the values $Z_1$ of the first layers to 1.05 (free carbon deposition), and subjected to a similar forging test. Consequently, no cracking was observed in the same numbers of forged products as Test Example 6.

Test Example 8

Substitutional samples for the samples Nos. 17, 18 and 23 in Test Example 6 were prepared by changing the grain sizes of WC in the first and uppermost layers to 5 to 6 $\mu$m and 1.5 $\mu$m respectively, in order to prevent cracking and improve wear resistance. When these samples were employed for forging the same numbers of test products as those in Test Example 6, no cracks resulted and abrasion loss values were reduced to about ½. Further, the first layers and the uppermost layers of these samples exhibited fracture toughness values of 10 to 13 MPa·m$^{1/2}$ and hardness values of 1500 to 1700 kg/mm$^2$ (Hv) respectively.

Test Example 9

Drill bits consisting of composite materials were prepared as samples Nos. 24 to 30 by connecting sintered bodies having layers of 2 mm in thickness which were successively stacked identically to those of the samples Nos. 17 to 23 in Test Example 6 in a method similar to that in Test Example 3, and employed similarly to Test Example 3. The ratio (steel volume×0.2)/(sintered body volume/layer number) was 1.0. Table 7 shows compressive stress values of the sintered bodies in the respective samples and the lives of the drill bits employed for excavation. It is clearly understood that the lives of the samples Nos. 24 to 30 were increased as compared with the results in Test Example 3.

TABLE 7

| | | Compressive Stress in Each Layer (GPa) | | | Life |
|---|---|---|---|---|---|
| Sample No. | | First Layer | Second Layer | Third Layer | (H) |
| Example | 24 | 1.0 | 0.8 | 0.6 | 590 |
| | 25 | 1.0 | 0.7 | 0.5 | 600 |
| | 26 | 0.1 | 0.1 | 0.05 | 390 |
| | 27 | 0.1 | 0.3 | 0.3 | 540 |
| | 28 | 0.2 | 0.2 | 0.15 | 400 |
| | 29 | 0.2 | 0.5 | 0.75 | 480 |
| | 30 | 0.2 | 0.48 | 0.73 | 500 |

Test Example 10

The samples in Test Example 3 were employed for preparing bits having slits in the sintered bodies and those having discontinuous composition regions in place of such slits respectively.

Figure 12:
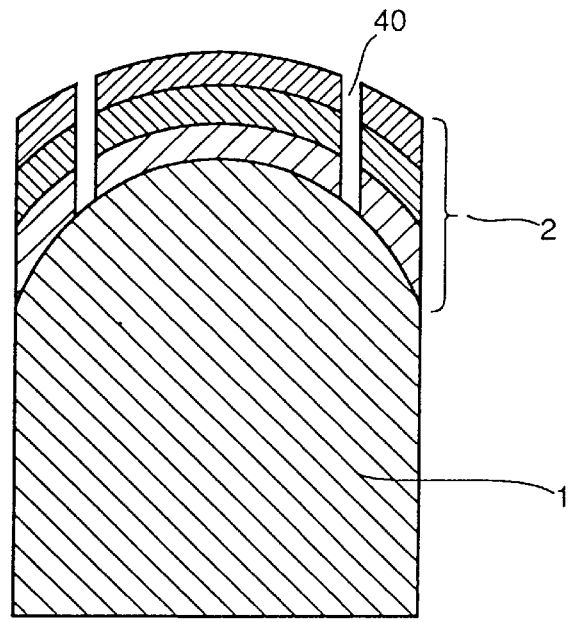
FIG. 12 is a longitudinal sectional view of the composite material shown in FIG. 9 provided with slits.

Each of the former samples was prepared by intermediately sintering a preliminarily pressed laminate, cutting the intermediately sintered body and providing concentric slits 40 as shown in FIG. 12, and heating/sintering the intermediately sintered body. Alternatively, each sample was prepared by employing carbon rings having shapes corresponding to the slits 40 at the time of charging powder for preliminarily pressing and sintering a pressed laminate while the powder was not charged into the portions or locations of the carbon rings. When the outer diameter of the pressed laminate was 45 mm, each slit had an inner diameter of 30 mm and a width of 5 mm.

Figure 13:
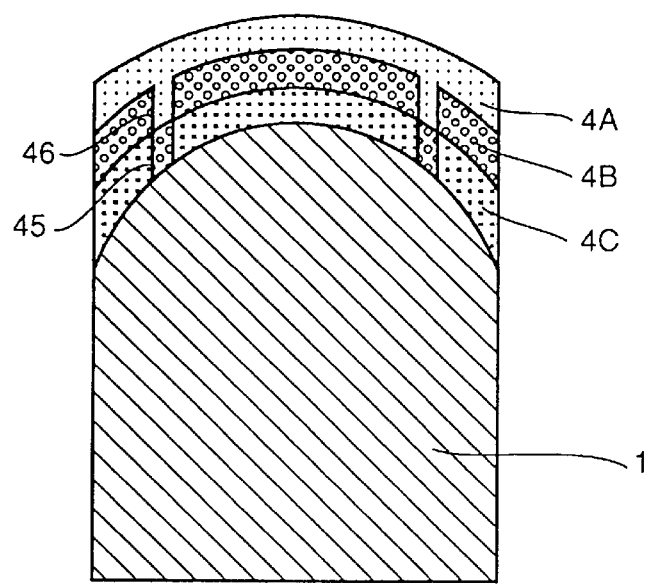
FIG. 13 is a longitudinal sectional view of the composite material shown in FIG. 9 provided with a discontinuous composition region.

On the other hand, each of the latter samples was prepared by selecting the shape of a punch for preliminary pressing and employing an auxiliary such as a carbon ring. First, a carbon ring having a shape corresponding to a discontinuous region was arranged at the time of charging raw material powder for the first layer. Then, the first layer was preliminarily pressed by a punch having a concave portion corresponding to the carbon ring, which in turn was extracted for preparing a pressed laminate having a groove in the first layer. This groove was charged with powder having a composition for the second layer, for forming a discontinuous region. The carbon ring was arranged on this discontinuous region, for similarly forming the second layer having a groove. The groove of the second layer was charged with powder having a composition for the third layer, and preliminarily pressed. As shown in FIG. 13, the obtained pressed laminate had such a sectional structure that grooves 45 and 46 of first and second layers 4C and 4B were charged with powder materials of compositions for the second and third layers 4B and 4A respectively while only the third layer 4A was increased in thickness. This pressed laminate was heated/sintered.

The samples provided with the slits and the discontinuous composition regions along directions parallel to connection surfaces in the sintered bodies exhibited substantially no cracks of the sintered bodies which were observed in Test Example 3, and the lives thereof were increased as compared with Test Example 3.

Figure 14:
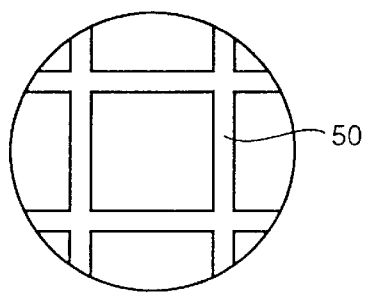
FIG. 14 is a plan view of a composite material having latticed slits corresponding to those in FIG. 12.

This is conceivably because the effect of stress relaxation was further homogenized and the characteristics of the multilayer structure were attained in good balance in each sample. Such an effect is attained by providing at least one layer forming the multilayer structure. The slits (discontinuous regions) are not restricted to concentric shapes, but those of other shapes such as latticed slits 50 shown in FIG. 14 can be employed, for example. In particular, a sintered body having a large diameter or the like can be provided with both of the slits and the discontinuous regions.

As shown in FIG. 10, each sample was energized in a direction different from the pressurizing direction in each of the aforementioned Test Examples. According to this method, it is possible to readily form such a temperature gradient that the sintered body surface side is at a high temperature and the opposite side is at a low temperature over the sintered body and the substrate. In order to improve the conventional method (see Japanese Patent Laying-Open No. 6-287076 etc.) having the energization direction which is identical to the direction of the pressurization axis for heating the surface (upper layer) side of the sintered body and forming a temperature gradient, the following structure is conceivable:

(1) The upper press rod which is in contact with the sintered body surface is prepared from a material having higher electric resistance than that of the material for the lower press rod which is in contact with the substrate;

(2) a surface of the upper press rod which is in contact with the sintered body from a material having high electric resistance; or (3) a surface of the upper press rod which is in contact with the sintered body has a shape having higher electric resistance than the opposite side by increasing the length of the upper press rod or reducing its section.

Test Example 11

Wear-resistant plates to be affixed to remarkably damaged portions of urban developing tools were prepared by connecting cemented carbide members onto substrates by using an apparatus similar to that shown in FIG. 5A. The structure of and manufacturing conditions for each wear-resistant plate were as follows:

Structure substrate: steel (SS41)

sintered body: cemented carbide of three-layer structure, thickness of each layer=1 mm, (substrate volume×0.2) ≧(sintered body volume/layer number)=2.0

Manufacturing Method energization heating/sintering pressure: 300 kg/cm$^2$, current: 3000 A, temperature: 1360° C., temperature rise time: 6 minutes, holding time: 2 minutes, cooling time: 10 minutes Tables 8 and 9 show the compositions and WC grain sizes of the employed cemented carbide materials and layer patterns of the cemented carbide materials respectively. Referring to Table 8, the sample of the composition $\alpha_4$ had two peaks (1.5 μm and 5.0 μm) in WC grain size distribution, which were obtained by mixing WC materials having mean grain sizes of 1.5 μm and 5.0 μm with each other. Alumina abrasive grains of 0.5 mm in mean grain size were sprayed onto the prepared plates for 10 minutes, for measuring reduction of thicknesses (sediment wear test). Table 9 also shows the results.

TABLE 8

| Composition No. | Composition | WC Mean Grain Size (μm) | Remarks |
|---|---|---|---|
| $\alpha_1$ | WC—8% Co | 2 | |
| $\alpha_2$ | " | 4 | |
| $\alpha_3$ | " | 6 | |
| $\alpha_4$ | " | 4.5 | Two Peaks in Grain Size Distribution |
| β | WC—20% Co | 3 | |
| γ | WC—40% Co | 3 | |
| δ | Ni | — | |

TABLE 9

| Sample No. | | Order of Stacked layers First Layer-Second Layer-Third Layer (Thickness:mm) | Reduction of Thickness (mm) | Remarks |
|---|---|---|---|---|
| Example | 41 | γ-β-$\alpha_1$ | 0.28 | Merely Worn |
| | 42 | γ-β-$\alpha_2$ | 0.20 | Merely Worn |
| | 43 | γ-β-$\alpha_3$ | 0.16 | Merely Worn |
| | 44 | γ-β-$\alpha_4$ | 0.13 | Merely Worn |
| Comparative Example | k | δ(0.1)-$\alpha_1$(3.0) | 0.38 | Worn and Partially Cracked |

The inventive samples exhibited superior sediment wear resistance as compared with the comparative sample. Further, the samples Nos. 42 and 43 having coarser grain sizes exhibited superior results as compared with the sample No. 41, conceivably because abrasion caused by dropping or falling out of WC grains was reduced due to the coarse WC grains. In addition, the sample No. 44 having two peaks of WC grain sizes attained a further excellent result, conceivably because the hardness was improved due to mixture of the fine grains, in addition to the coarse WC grains.

Test Example 12

Wear-resistant plates of samples Nos. 45 and 46 were prepared.

Figure 15:
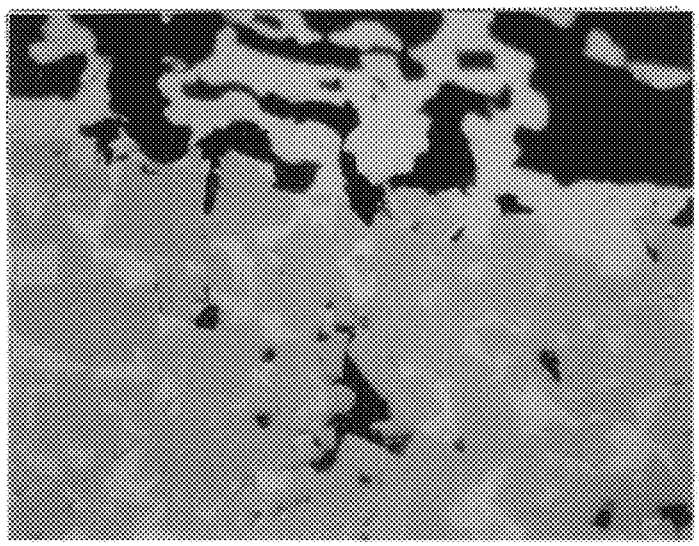
FIG. 15 is a microphotograph showing a section of a sintered body presenting polygonal WC grains.
Figure 16:
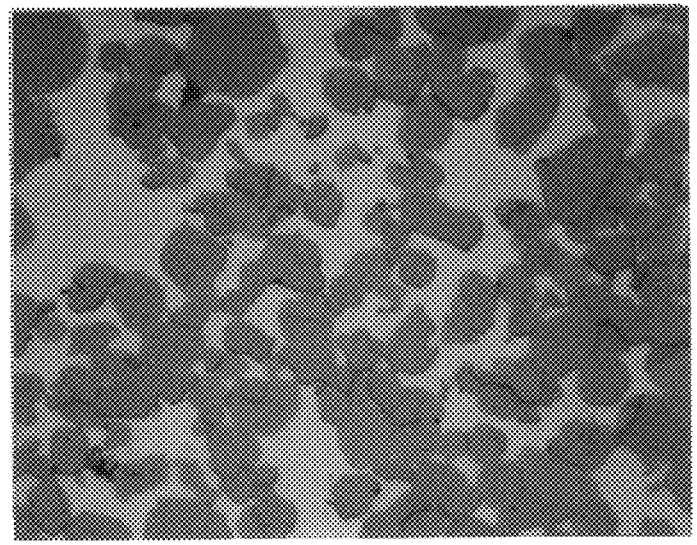
FIG. 16 is a microphotograph showing a section of a sintered body presenting rounded WC grains.

The sample No. 45 was prepared by reducing only the sectional area of a heater to ⅔ that in Test Example 11 and increasing its temperature to 1550° C. The remaining conditions were similar to those for the sample No. 41 in Test Example 11. Thus, the WC grains were grown to 4 μm in mean grain size in the uppermost layer ($\alpha_1$' layer) during sintering, to be polygonal in shape only in this layer. In the remaining layers, the WC grains were in rounded shapes. FIG. 15 is a microphotograph showing a section of the third layer presenting polygonal WC grains. Referring to FIG. 15, black and white portions are pores and binder phases respectively, while gray dispersed pieces are WC grains. FIG. 16 is a microphotograph showing a section of another layer presenting rounded WC grains. Referring to FIG. 16, white portions and gray dispersed pieces are binder phases and WC grains respectively.

The sample No. 46 was prepared by separately sintering powder of a composition $\alpha_1$ by a general sintering method in a vacuum at 1400° C. for 1 hour and grinding a surface of the obtained sintered body. On the other hand, powder materials of compositions γ and β were successively stacked on a substrate. The sintered body of the composition $\alpha_1$ was stacked on the powder of the composition β, for forming the wear-resistant plate of the sample No. 46 similarly to Test Example 11. Thus, the WC grains were grown to 4.5 μm in mean grain size in the uppermost layer ($\alpha_1$" layer) to be polygonal in shape only in this layer.

Such a sintered body containing polygonal WC grains only in its surface layer can be sintered/connected to a substrate by means of: (1) forming a temperature gradient so that the temperature is increased toward the surface layer for sintering/connecting the sintered body; or (2) forming a surface layer by previously sintering the same by a general sintering method in a vacuum at 1350 to 1450° C. for 1 hour and arranging sintered body raw material powder for an intermediate layer between the surface layer and the substrate for sintering/connecting the same in a short time at a low temperature.

A sediment wear test was conducted on the samples Nos. 45 and 46 along with the sample No. 42 and a comparative sample k similarly to Test Example 11, except that only the test time was increased to 30 minutes. Table 10 shows the results.

Test Example 13

Samples Nos. 47 to 50 were prepared similarly to the sample No. 42 in Test Example 11, except that each layer had a thickness of 2 mm, (substrate volume×0.2)≧(sintered body volume/layer number)=1.0 and the programming rates were varied during manufacturing. When the programming rate is increased, a current flowing to a heater during temperature rise is increased so that the temperature of the upper layer part is increased in advance to cause a distribution in the binder phase content in the vicinity of the outermost surface of the third layer. In other words, a liquid phase of the binder phase metal appeared in the upper layer part of each sample earlier than in the lower layer side, and this liquid phase moved toward the lower layer side to result in a distribution of the binder phase content. Table 11 shows results of measurement of widths of regions (first regions) having binder phase contents of not more than 70% of the average compositions as measured from the outermost surfaces, and the widths of regions (second regions) enriched in binder phase content in portions immediately under the first regions in the respective samples.

TABLE 11

| Sample No. | | Temperature Rise Time (mim) | Width(μm) of Region having Binder Phase Content of not more than 70% of Mean Composition <First Region> | Width(μm) of Region Enriched in Binder Phase Content in Portion immediately under First Region <Second Region> |
|---|---|---|---|---|
| Example | 47 | 6 | 0 | 0 |
| | 48 | 4 | 10 | 8 |
| | 49 | 2 | 90 | 60 |
| | 50 | 0.5 | 1000 | 500 |

Figure 17:
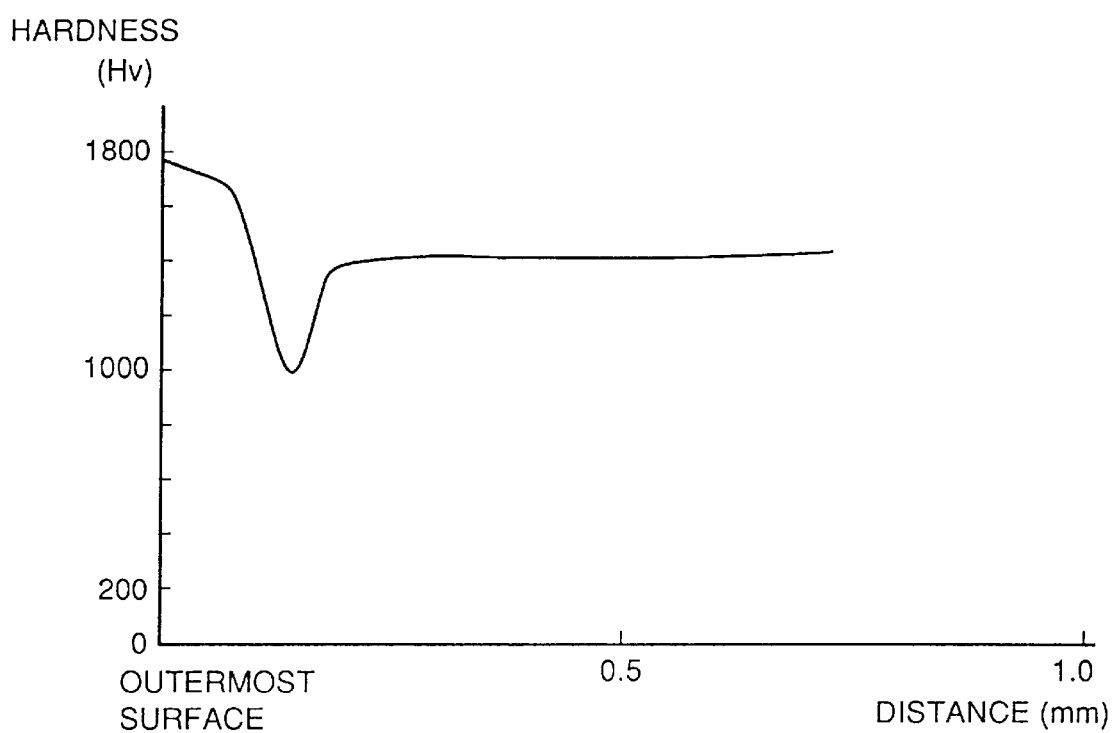
FIG. 17 is a graph showing hardness distribution from the outermost surface of a sintered body according to the present invention.
Figure 18:
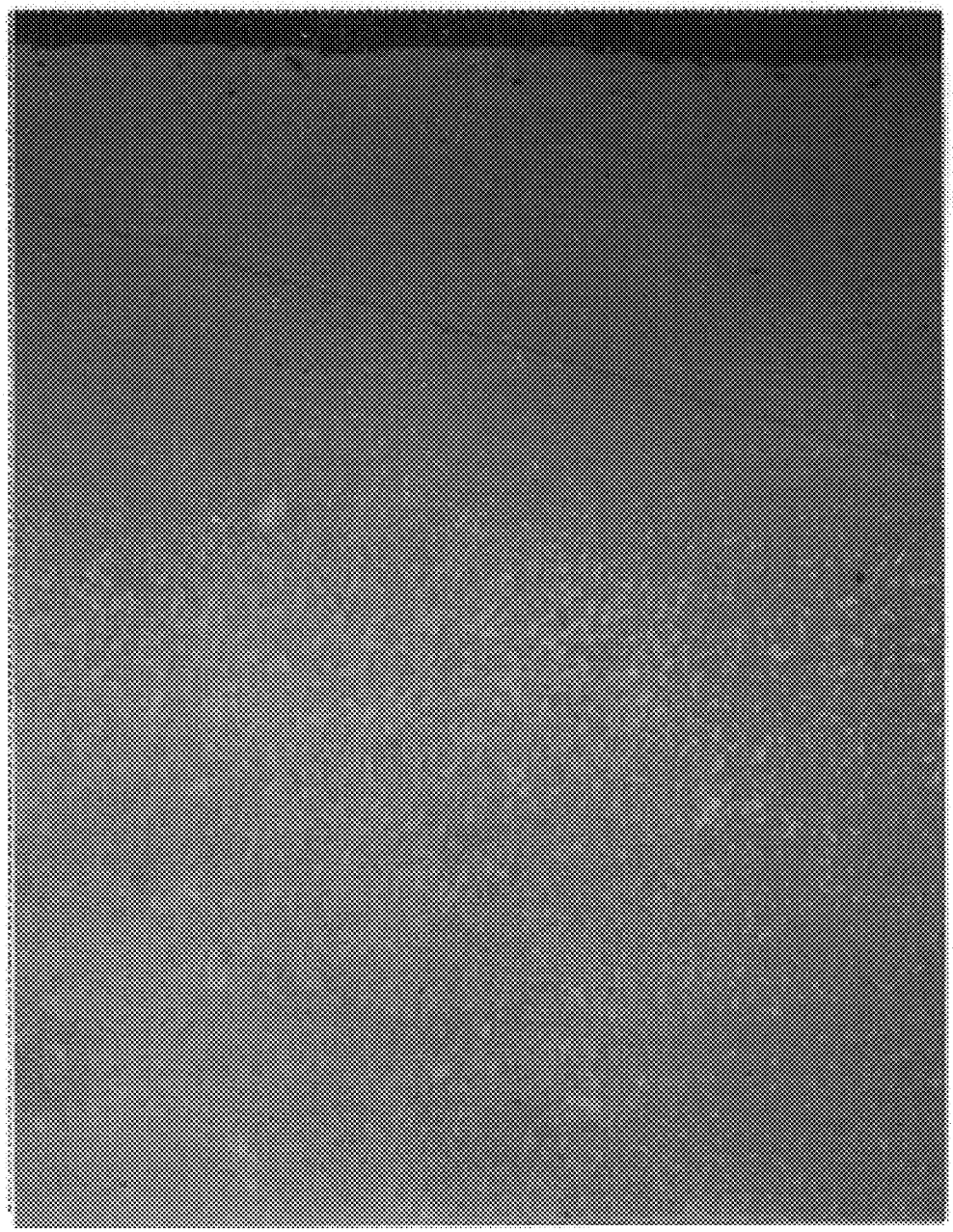
FIG. 18 is a microphotograph showing a section of the sintered body employed in FIG. 17 in the vicinity of its surface.

As shown in Table 11, the widths of the first and second regions were increased as the temperature rise times were reduced. FIG. 17 shows the hardness distribution from the outermost surface of the sintered body of the sample No. 49, and FIG. 18 is a microphotograph showing its section. As shown in the graph of FIG. 17, the sample No. 49 had high hardness in the first region, i.e. in the range of about 90 μm from the outermost surface, while the hardness was reduced in the second region immediately under the first region and then again increased inwardly from the second region. As shown in FIG. 18, the portion around the outermost surface was dense with a small binder phase content, a portion having a number of binder phases (white points) was observed in an intermediate portion, and the binder phase content was reduced again in the bottom or innermost layer.

TABLE 10

| Sample No. | | Orders of Stacked layers First Layer-Second Layer-Third Layer (Thickness:mm) | Reduction of Thickness (mm) | Remarks |
|---|---|---|---|---|
| Example | 42 | γ-β-$\alpha_2$ | 0.55 | Worn and Cracked |
| | 45 | γ-β-$\alpha_1$' | 0.52 | Merely Worn |
| | 46 | γ-β-$\alpha_1$" | 0.58 | Merely Worn |
| Comparative Example | k | δ(0.1)-$\alpha_1$(3.0) | — | Cracked in 20 min. |

While the samples Nos. 42, 45 and 46 exhibited substantially identical WC grain sizes and substantially equal abrasion loss values after the test, the samples Nos. 45 and 46 presented no cracks although the sample No. 42 was cracked. This is conceivably because the WC grains forming the outermost surface layers had polygonal shapes for increasing the strength.

In other words, an extreme or local maximum value is recognized in the binder phase content of the second region. Referring to FIG. 18, the black upper portion of the microphotograph is the background.

The samples Nos. 47 to 50 were subjected to a sediment wear test similarly to Test Example 11. Table 12 shows the results.

TABLE 12

| Sample No. | | Reduction of Thickness (μm) | Remarks |
|---|---|---|---|
| Example | 47 | 0.59 | Worn and Cracked |
| | 48 | 0.45 | Merely Worn |
| | 49 | 0.41 | Merely Worn |
| | 50 | 0.38 | Worn and Cracked |

As shown in Table 12, cracks were caused in the sintered bodies of the sample No. 47 having no first and second regions and the sample No. 50 having the widest first and second regions.

Test Example 14

Drill bits of the same shapes as those in Test Example 3 were prepared from the same raw material powders as those in Table 2. These drill bits were different from those in Test Example 3 in that the compositions were changed from the central portions toward the outer peripheral portions in the respective layers of the sintered bodies. Therefore, a plurality of types of raw powder materials were prepared by increasing or reducing binder phase contents or B1 crystal contents, so that the plurality of types of raw powder materials had mean compositions shown in Table 2. The highest binder phase content (B1 crystal content) was larger by about 20% than the lowest binder phase content (B1 crystal content). On the other hand, comparative samples were prepared in the blending ratios shown in Table 2.

The samples were prepared in a substantially similar procedure to that described in Test Example 3, except that the binder phase metal contents and the B1 crystal contents were increased toward the outer peripheries in the powder materials forming the samples Nos. 51 to 54 and Nos. 55 to 58 respectively. The raw powder materials may be charged stepwise through partition plates, or may be so charged that the binder phase contents are substantially continuously changed from the central portions toward the outer peripheral portions. The preliminarily pressed laminates were sintered by an apparatus and under conditions similar to those in Test Example 3.

The inventive samples Nos. 51 to 58 and comparative samples 1 to p having homogeneous compositions in the respective layers were subjected to an excavation test similarly to Test Example 3. Table 13 shows the results. As shown in Table 13, the lives were remarkably improved in the inventive samples having the layers whose compositions were changed or varied in the direction parallel to the connection surfaces, while the comparative samples had short lives.

TABLE 13

| Sample No. | | Order of Stacked layers First Layer-Second Layer-Third Layer (Thickness:mm) | Steel Volume × 0.2 Sintered Body Volume/Layer Number | Life (H) | Cause for End of Life and Damage |
|---|---|---|---|---|---|
| Example | 51 | D(5)-A(0.2) | 1.0 | 180 | Normal Wear |
| | 52 | D(2)-B(2)-A(2) | 1.0 | 330 | Normal Wear and Partial Cracking |
| | 53 | D(2)-C(2)-A(2) | 1.2 | 320 | Normal Wear |
| | 54 | D(2)-E(1)-A(2) | 1.5 | 380 | Normal Wear and Partial Cracking |
| | 55 | F(1)-G(1) | 2.0 | 250 | Normal Wear |
| | 56 | F(1)-H(1) | 2.0 | 260 | Normal Wear Partial Cracking |
| | 57 | F(1)-G(1)-H(1) | 2.0 | 260 | Normal Wear and Partial Cracking |
| | 58 | F(1)-J(1)-A(1) | 2.0 | 380 | Normal Wear |
| Comparative Example | l | D(5)-(0.1) | 1.0 | 90 | Wear |
| | m | D(6)-(0.2) | 1.1 | 25 | Wear and Cracking |
| | n | D(2)-(0.2) | 0.95 | 50 | Wear and Cracking |
| | o | D(3) | 1.1 | 15 | Wear and Cracking |
| | p | D(1)-G(0.3) | 0.9 | 15 | Wear and Cracking |

Test Example 15

Composite materials of samples Nos. 51' to 58' having concentric discontinuous regions in sintered bodies as described in Test Example 10 were prepared and tested. These samples are prepared under the same conditions as those in Test Example 14, except that the sizes of the discontinuous regions and the method of forming the same were similar to those in Test Example 10. In this Example, inner and outer peripheries of the discontinuous regions were charged with raw powder materials having small and large binder phase contents (B1 crystal contents) respectively. The obtained bits were subjected to an excavation test under the same conditions as Test Example 14. Consequently, it was found that the lives of these samples were increased as compared with those in Test Example 14, as shown in Table 14.

TABLE 14

| Sample No. | | Order of Stacked layers First Layer-Second Layer-Third Layer (Thickness:mm) | Steel Volume × 0.2 Sintered Body Volume/Layer Number | Life (H) | Cause for End of Life and Damage |
|---|---|---|---|---|---|
| Example | 51' | D(5)-A(0.2) | 1.0 | 200 | Normal Wear |
| | 52' | D(2)-B(2)-A(2) | 1.0 | 350 | Normal Wear and partial Cracking |
| | 53' | D(2)-C(2)-A(2) | 1.2 | 350 | Normal Wear |
| | 54' | D(2)-E(1)-A(2) | 1.5 | 400 | Normal Wear and partial Cracking |
| | 55' | F(1)-G(1) | 2.0 | 280 | Normal Wear |
| | 56' | F(1)-H(1) | 2.0 | 280 | Normal Wear and partial Cracking |
| | 57' | F(1)-G(1)-H(1) | 2.0 | 290 | Normal Wear and partial Cracking |
| | 58' | F(1)-J(1)-A(1) | 2.0 | 400 | Normal Wear |

Test Example 16

While the compositions were changed from the central portions toward the outer peripheral portions in two stages inside and outside the discontinuous regions in the respective layers of the sintered bodies in Test Example 15, composite materials of samples Nos. 61 to 68 were so prepared that the compositions were not stepwisely but continuously changed from central portions toward outer peripheries. The remaining conditions were similar to those in Test Example 15. Table 15 shows the lives of bits prepared in the aforementioned manner. The sintered bodies exhibited substantially no cracks, and the lives of the bits were further improved.

TABLE 15

| Sample No. | Life (H) | Cause for End of Life |
|---|---|---|
| 61 | 200 | Normal Wear |
| 62 | 380 | Normal Wear |
| 63 | 380 | Normal Wear |
| 64 | 450 | Normal Wear |
| 65 | 280 | Normal Wear |
| 66 | 320 | Normal Wear |
| 67 | 320 | Normal Wear |
| 68 | 400 | Normal Wear |

While it is effective to change or vary the compositions of all layers in the direction parallel to the connection surface in the multilayer structure, the effect of stress relaxation can be attained if the composition of only the first layer which is in contact with the substrate is changed. Thus, it is necessary to change the composition of at least one layer.

Test Example 17

Forging punches were prepared from SKD11 steel substantially similarly to Test Example 6, except that grain sizes of WC forming sintered bodies were reduced toward the outer peripheries. Referring to Tables 16 and 17, the WC grain sizes were stepwisely and continuously changed from inner peripheral portions toward outer peripheral portions similarly to Test Examples 15 and 16 in samples Nos. 71 to 77 and Nos. 71' to 77' respectively. On the other hand, the WC grain sizes were not changed in a comparative sample.

Structure: mean grain size of WC in first layer: 5 to 6 $\mu$m
mean grain size of WC in uppermost layer and outermost periphery: 1.5 $\mu$m
Fracture Toughness: 10 to 13 MPa·m$^{1/2}$ in first layer central portion
Hardness: 1190 to 1210 kg/mm$^2$ in first layer central portion, 1500 to 1700 kg/mm$^2$ in uppermost layer and outermost periphery The remaining structures and sintering conditions were identical to those in Test Example 6.

The punches of the respective samples were subjected to a forging test similarly to Example 6. Tables 16 and 17 show the results. The lives of the inventive samples were remarkably increased as compared with the comparative sample in which the WC grain sizes of the sintered body were not changed or varied in parallel with the connection surface.

TABLE 16

| Sample No. | | Order of Stacked layers First Layer-Second Layer-Third Layer (Thickness:mm) | Life (numbers) | Cause for End of Life |
|---|---|---|---|---|
| Example | 71 | C-B-A | 28,000 | Wear and Partial Cracking of Sintered Body |
| | 72 | C-B-A | 33,000 | Wear and Partial Cracking of Sintered Body |
| | 73 | F-G-I | 19,000 | Wear |
| | 74 | F-J-A | 34,000 | Wear and Partial Cracking of Sintered Body |
| | 75 | K-L-M | 20,000 | Wear |
| | 76 | K-N-O | 38,000 | Wear and Partial Cracking of Sintered Body |
| | 77 | P-N-O | 38,000 | Wear and Partial Cracking of Sintered Body Separation on Connection Surface between |

TABLE 16-continued

| Sample No. | | Order of Stacked layers First Layer-Second Layer-Third Layer (Thickness:mm) | Life (numbers) | Cause for End of Life |
|---|---|---|---|---|
| Comparative Example | q | C-B-A | 1,000 | Sintered Body and Steel Substrate |

TABLE 17

| Sample No. | | Order of Stacked layes First Layer-Second Layer-Third Layer (Thickness:mm) | Life (numbers) | Cause for End of Life |
|---|---|---|---|---|
| Example | 71' | C-B-A | 35,000 | Wear |
|  | 72' | C-B-A | 40,000 | Wear |
|  | 73' | F-G-I | 19,000 | Wear |
|  | 74' | F-J-A | 40,000 | Wear |
|  | 75' | K-L-M | 19,000 | Wear |
|  | 76' | K-N-O | 43,000 | Wear |
|  | 77' | P-N-O | 45,000 | Wear |
| Comparative Example | q | C-B-A | 1,000 Sintered | Separation on Connection Surface between Body and Steel Substrate |

Test Example 18

Drill bits of samples Nos. 81 to 88 were prepared similarly to those in Test Example 14 except that slits were formed in sintered bodies as shown in FIG. 12, and subjected to an excavation test similarly to Test Example 14. The slits were formed by intermediately sintering raw powder materials and cutting the intermediately sintered bodies. The slits were concentrically formed with inner diameters of 30 mm and widths of 5 mm. The lives of the drill bits were improved as shown in Table 18.

TABLE 18

| Sample No. | Life (H) | Cause for End of Life |
|---|---|---|
| 81 | 230 | Normal Wear |
| 82 | 370 | Normal Wear |
| 83 | 330 | Normal Wear |
| 84 | 390 | Normal Wear |
| 85 | 330 | Normal Wear |
| 86 | 330 | Normal Wear |
| 87 | 300 | Normal Wear |
| 88 | 380 | Normal Wear |

Test Example 19

Drill bits of samples Nos. 91 to 98 were prepared similarly to Test Example 18 except that only first layers of slits were charged with raw powder materials for second layers and sintered, and subjected to a similar excavation test. In other words, slits formed in the second and third layers were charged with no materials. It was possible to readily form such slits by eliminating charging of the raw powder materials at the slit locations by using carbon rings during the preliminary pressing. Consequently, improvement of the drill bit lives was recognized as in Table 19.

TABLE 19

| Sample No. | Life (H) | Cause for End of Life |
|---|---|---|
| 91 | 240 | Normal Wear |
| 92 | 380 | Normal Wear |
| 93 | 350 | Normal Wear |
| 94 | 400 | Normal Wear |
| 95 | 350 | Normal Wear |
| 96 | 350 | Normal Wear |
| 97 | 300 | Normal Wear |
| 98 | 380 | Normal Wear |

The slits described with reference to the aforementioned Test Examples are adapted to relax stress differences between respective portions in the connected bodies, similarly to the aforementioned discontinuous regions. Therefore, the slits are preferably provided in the respective layers of the sintered bodies as described in the above Test Examples, while it is necessary to provide such slit(s) at least in one layer, since the slit contributes to stress relaxation even if the same is provided only in one layer.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A composite material comprising:
    a metal substrate; and
    a sintered body that has a connection surface connected to a surface of said substrate, and that comprises at least one component selected from the group consisting of cemented carbides, cermets, ceramics and stellite;
    wherein said sintered body has a multilayer structure consisting of a plurality of layers respectively having compositions that differ from one another in a direction perpendicular to said connection surface, said sintered body has a sintered body volume and said substrate has a substrate volume satisfying: (said substrate volume)×0.2≧(said sintered body volume)/(number of said layers), and each of said layers has a respective thickness in a range of at least 0.2 mm and not more than 5 mm.

2. The composite material in accordance with claim 1, wherein said at least one component of said sintered body comprises hard phase grains dispersed and held in a binder phase comprising a metal.

3. The composite material in accordance with claim 2, wherein a first one of said layers being in contact with said surface of said substrate has the largest content of said binder phase among said plurality of layers.

4. The composite material in accordance with claim 2, wherein the content of said binder phase increases in a direction parallel to said connection surface from a central portion toward an outer periphery in at least one of said plurality of layers.

5. The composite material in accordance with claim 2, wherein said plurality of layers includes an n-th layer counted from said connection surface having a binder phase content Xn and an n+1-th layer located adjacent said n-th layer on a side thereof opposite said connection surface and having a binder phase content Xn+1 such that Xn−20≧Xn+1≧Xn−5.

6. The composite material in accordance with claim 2, wherein said binder phase is predominantly composed of said metal which consists of Fe, Co and Ni, the weight ratio of (Co+Fe)/Ni is the greatest in a first one of said layers being in contact with said substrate, and the weight ratio of (Co+Fe)/Ni respectively in said layers diminishes in a direction away from said connection surface among said layers.

7. The composite material in accordance with claim 2, wherein said binder phase is predominantly composed of said metal which consists of Fe, Co and Ni, the weight ratio of Fe/(Co+Ni) is the greatest in a first one of said layers being in contact with said substrate, and the weight ratio of Fe/(Co+Ni) respectively in said layers diminishes in a direction away from said connection surface among said layers.

8. The composite material in accordance with claim 2, wherein a first one of said layers being in contact with said substrate has pores with a size of less than 25 $\mu$m, and has a porosity in excess of 0.6 vol. %, and the uppermost one of said layers has a porosity of not more than 0.2 vol. %.

9. The composite material in accordance with claim 2, wherein a first one of said layers being in contact with said substrate contains precipitated free carbon.

10. The composite material in accordance with claim 2, wherein a first one of said layers being in contact with said substrate has a fracture toughness of at least 10 MPa·m$^{1/2}$, and the uppermost one of said layers has a hardness of at least 1500/Hv.

11. The composite material in accordance with claim 10, wherein a central portion of each of said layers has a compressive residual stress σ being in the range of 0.1≧σ≧1.0 GPa.

12. The composite material in accordance with claim 1, wherein at least one of said layers has a composition that varies in a direction parallel to said connection surface.

13. The composite material in accordance with claim 1, wherein at least one of said layers has a slit therein.

14. The composite material in accordance with claim 2, wherein said sintered body consists of said cemented carbide which contains hard phase grains of WC, the mean grain size of said grains of WC in a first one of said layers being in contact with said substrate is at least 4 $\mu$m, the mean grain size of said grains of WC in the uppermost one of said layers is not more than 2 $\mu$m, and the mean grain sizes of said grains of WC respectively in said layers diminish among said layers from said first layer to said uppermost layer in a direction away from said connection surface.

15. The composite material in accordance with claim 2, wherein said sintered body consists of said cemented carbide which contains hard phase grains of WC, and the grain sizes of said grains of WC diminish from a central portion toward the outer periphery at least in one of said layers.

16. The composite material in accordance with claim 2, wherein said hard phase grains in a first one of said layers being in contact with said substrate contain B1 crystals of at least one of carbides, nitrides and carbo-nitrides of metals that belong to the groups 4a, 5a and 6a and that predominantly include Ti.

17. The composite material in accordance with claim 16, wherein an n-th one of said layers counted from said connection surface has a content Yn of said B1 crystals and an n+1-th one of said layers counted from said connection surface and located adjacent said n-th layer on a side thereof opposite said connection surface has a content Yn+1 of said B1 crystals, such that Yn−40≧Yn+1≧Yn−10.

18. The composite material in accordance with claim 16, wherein at least one of said layers has a content of said B1 crystals that increases from a central portion toward an outer periphery in said at least one of said layers.

19. A method of manufacturing a composite material, in accordance with claim 1, comprising the steps of:

arranging a raw material member for a sintered body having a linear expansion coefficient being different from that of a metal substrate on a surface of said substrate; and heating a surface side of said raw material member by heating means while applying pressure to said surface side of said raw material member by pressurizing means, thereby sintering said raw material member and connecting the same to said substrate.

20. The method of manufacturing a composite material in accordance with claim 19, wherein said heating/pressurizing means is relatively moved with respect to said raw material member for said sintered body, so that said sintered body having an area being larger than a working area of said heating/pressurizing means for said raw material member is connected to said substrate.

21. The method of manufacturing a composite material in accordance with claim 19, wherein said heating means is a heater being placed on said surface of said raw material member for said sintered body, and said pressurizing means is adapted to press said heater against said raw material member, so that said heater is energized for sintering said raw material member.

22. The method of manufacturing a composite material in accordance with claim 21, wherein said heater has a function of a forming die.

23. The method of manufacturing a composite material in accordance with claim 21, wherein said heating means includes a heater for heating a portion of said raw material member around its peripheral portion.

24. The method of manufacturing a composite material in accordance with claim 23, wherein said pressurizing means has a function of pressurizing a side surface of said outer peripheral portion of said raw material member.

25. The composite material in accordance with claim 2, wherein each respective n-th one of said layers counted from said substrate has a respective composition characterized by the value $Z_n$ defined as $Z_n=(C_n-b_n)/(a_n-b_n)$ in which $C_n$ represents the carbon content in said n-th layer, $a_n$ represents the lower limit of carbon content at which free carbon will be precipitated in said n-th layer, and $b_n$ represents the upper limit of carbon content at which an $\eta$ phase will be precipitated in said n-th layer, such that $Z_n$ respectively increases among said layers in a direction toward said substrate for respective decreasing values of n counted from said substrate.

26. The composite material in accordance with claim 16, wherein each of said layers has a respective content of said B1 crystals, which respectively diminishes among said layers in a direction away from said connection surface.

27. The composite material in accordance with claim 1, wherein said connection surface of said sintered body is in contact with and is directly connected with said surface of said substrate.

28. The composite material in accordance with claim 1, wherein said sintered body comprises a WC cemented carbide member, which has said connection surface and an outer surface opposite said connection surface, and which comprises a binder phase and WC grains dispersed in said binder phase, said plurality of layers includes a first layer that extends from said outer surface into said cemented carbide member toward said substrate for a distance of 10 to 1000 $\mu$m, and that has a content of said binder phase of not more than 5 wt. %, and said plurality of layers further includes a second layer that borders on and extends from said first layer toward said substrate for a distance of not more than 500 $\mu$m, and that has a content of said binder phase which is greater than said content of said binder phase in said first layer.

29. A composite material comprising:

a metal substrate; and a cemented carbide member that has a connection surface connected to a surface of said substrate; wherein said cemented carbide member has a multilayer structure consisting of a plurality of layers respectively having compositions that differ from one another in a direction perpendicular to said connection surface, the uppermost one of said layers furthest from said connection surface comprises WC having a mean grain size in said uppermost layer of at least 4 $\mu$m, said uppermost layer contains WC grains predominantly having polygon shapes, and at least one of said layers other than said uppermost layer contains WC grains predominantly having rounded shapes.

30. The composite material in accordance with claim 29, wherein said uppermost layer contains WC having a WC grain size distribution having a first coarse grain size distribution peak of a grain size of at least 4 $\mu$m and a second fine grain size distribution peak of a grain size of not more than 2 $\mu$m.

* * * * *

UNITED STATES PATENT AND TRADEMARK OFFICE
CERTIFICATE OF CORRECTION

PATENT NO. : 5,989,731
DATED : Nov. 23, 1999
INVENTOR(S) : Arisawa et al.

It is certified that error appears in the above-identified patent and that said Letters Patent is hereby corrected as shown below:

Col. 3, line 50, replace line to read "contributing to stress relaxation due to a resulting continu-";

Col. 3, line 67 after "variation" replace "of" by --or--;

Col. 6, line 3, before "relatively" replace "is" by --are--;

Col. 6, line 18, after "gradient" replace "can be so formed that" by --is formed so that--;

Col. 7, line 18, after "compositions" insert --, i.e. layer compositions that change--;

Table 1, col. "Stainless Steel", line 1, replace "(Surface Side)" by --(Outer Surface Side)--;

Table 1, col. "$ZrO_2$", line 1, replace "(Surface Side)" by --(Outer Surface Side)--;

Table 1, column "Stainless Steel", line 6, replace "outer Surface Side)" by --Surface Side)--;

Table 1, col. "$ZrO_2$", line 6, replace "outer Surface Side)" by --Surface Side)--;

Col. 19, line 48, after "body" insert --is prepared--;

UNITED STATES PATENT AND TRADEMARK OFFICE
CERTIFICATE OF CORRECTION

PATENT NO. : 5,989,731
DATED : Nov. 23, 1999
INVENTOR(S) : Arisawa et al.

It is certified that error appears in the above-identified patent and that said Letters Patent is hereby corrected as shown below:

Col. 19, line 57, after "substrates" delete --by--;

Table 13, col. "Cause for End of Life and Damage", line 8, after "Normal Wear" insert -- and--;

Col. 24. line 51, replace "are" by --were--;

Table 17, col. "Life (numbers)", line 11, delete "Sintered";

Table 17, col. "Cause for End of Life", line 10, after "between" insert --Sintered--;

Signed and Sealed this

Fifteenth Day of August, 2000

Attest:

Q. TODD DICKINSON

Attesting Officer

Director of Patents and Trademarks

UNITED STATES PATENT AND TRADEMARK OFFICE
CERTIFICATE OF CORRECTION

PATENT NO. : 5,989,731
DATED : November 23, 1999
INVENTOR(S) : Arisawa et al.

It is certified that error appears in the above-identified patent and that said Letters Patent is hereby corrected as shown below:

Title page,
Item [57], ABSTRACT,
Line 11, replace "volume/number of layers" by -- volume/layer number --;

Column 3,
Line 50, replace line to read "contributing to stress relaxation due to a resulting continu- --;
Line 67, after "variation" replace "of" by -- or --;

Column 6,
Line 3, before "relatively" replace "is" by -- are --;
Line 18, after "gradient" replace "can be so formed that" by -- is formed so that --;

Column 7,
Line 18, after "compositions" insert -- , i.e. layer compositions that change --;

Columns 11 and 12,
Table 1, col. "Stainless Steel", line 1 replace "(Surface Side)" by -- (Outer Surface Side) --;
Table 1, col. "$ZrO_2$", line 1, replace "(Surface Side)" by -- (Outer Surface Side) --;
Table 1, col. "Stainless Steel", line 6, replace "outer Surface Side)" by -- Surface Side) --;
Table 1, col. "$ZrO_2$", line 6, replace "outer Surface Side)" by -- Surface Side) --;

Column 19,
Line 48, after "body" insert -- is prepared --;
Line 57, after "substrates" delete -- by --;

Columns 24 and 25,
Table 13, col. "Cause for End of Life and Damage", line 8, after "Normal Wear" insert -- and --;

Column 24,
Line 51, replace "are" by -- were --;

Columns 25 and 26,
Table 16, col. "Cause for End of Life", delete line 12, 13 and 14;

UNITED STATES PATENT AND TRADEMARK OFFICE
CERTIFICATE OF CORRECTION

PATENT NO. : 5,989,731
DATED : November 23, 1999
INVENTOR(S) : Arisawa et al.

It is certified that error appears in the above-identified patent and that said Letters Patent is hereby corrected as shown below:

<u>Columns 27 and 28,</u>
Table 16-continued, col. "Cause for End of Life", above "Sintered Body and Steel" insert -- Cracking of Sintered Body, Separation on Connection Surface between --;
Table 17, col. "Life (numbers)", line 11, delete "Sintered";
Table 17, col. "Cause for End of Life", line 10, after "between" insert -- Sintered --;

Signed and Sealed this

Twentieth Day of May, 2003

JAMES E. ROGAN
*Director of the United States Patent and Trademark Office*